(12) United States Patent
Yanagawa et al.

(10) Patent No.: US 12,457,870 B2
(45) Date of Patent: Oct. 28, 2025

(54) LIGHT EMITTING DEVICE, IMAGE CAPTURING DEVICE, ELECTRONIC APPARATUS, AND MOVING BODY

(71) Applicant: CANON KABUSHIKI KAISHA, Tokyo (JP)

(72) Inventors: Shusuke Yanagawa, Kanagawa (JP); Satoshi Kato, Kanagawa (JP); Takeshi Akiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 18/316,500

(22) Filed: May 12, 2023

(65) Prior Publication Data
US 2023/0389381 A1 Nov. 30, 2023

(30) Foreign Application Priority Data
May 27, 2022 (JP) ................................ 2022-087101

(51) Int. Cl.
*H10K 59/131* (2023.01)
*H04N 23/55* (2023.01)
*H04N 23/56* (2023.01)
*H04N 23/57* (2023.01)
*H10K 59/127* (2023.01)

(52) U.S. Cl.
CPC ........... *H10K 59/131* (2023.02); *H04N 23/55* (2023.01); *H04N 23/56* (2023.01); *H10K 59/1275* (2023.02)

(58) Field of Classification Search
CPC ............ H10K 59/127; H10K 59/1275; H10K 59/131; H04N 23/57
USPC ..................................................... 348/207.99
See application file for complete search history.

(56) References Cited

U.S. PATENT DOCUMENTS

| | | | |
|---|---|---|---|
| 2021/0091161 A1* | 3/2021 | Baek | ................... H10K 59/873 |
| 2021/0408448 A1 | 12/2021 | Oshige | |
| 2023/0090509 A1 | 3/2023 | Kato | |
| 2023/0099575 A1 | 3/2023 | Iwane | |
| 2023/0316964 A1* | 10/2023 | Park | ........................ G09G 3/32 |

FOREIGN PATENT DOCUMENTS

| | | |
|---|---|---|
| JP | 2018-174246 A | 11/2018 |
| JP | 2022-022623 A | 2/2022 |

* cited by examiner

*Primary Examiner* — Anthony J Daniels
(74) *Attorney, Agent, or Firm* — Venable LLP

(57) ABSTRACT

A light emitting device in which a first substrate including a first semiconductor substrate and a first wiring layer, a second substrate including a second semiconductor substrate and a second wiring layer, and a light emitting layer are stacked. The light emitting layer is arranged between a structure including the first substrate and the second substrate and a predetermined virtual plane. At least one of the first wiring layer and the second wiring layer includes a pad electrode. The light emitting layer and the structure include an aperture that exposes the pad electrode to the virtual plane.

26 Claims, 20 Drawing Sheets

FIG. 5
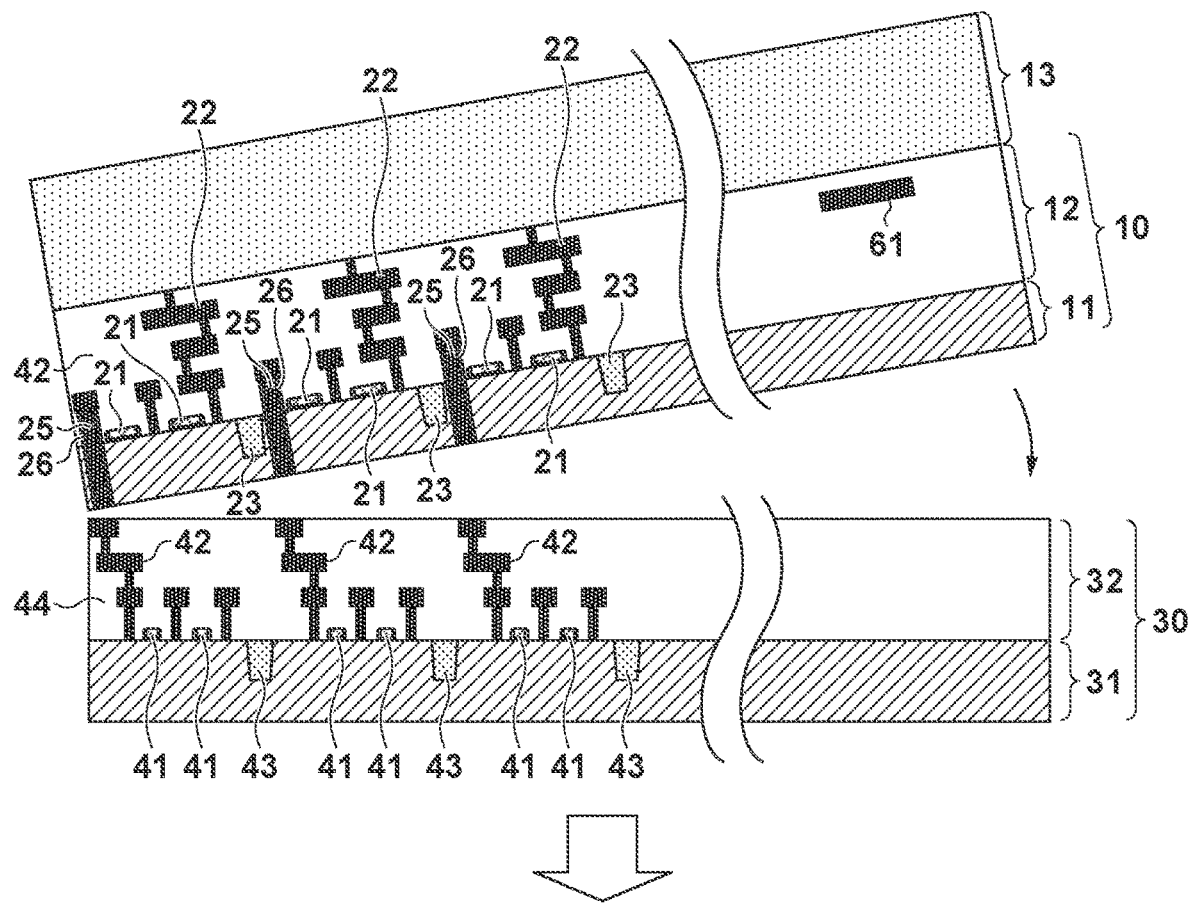
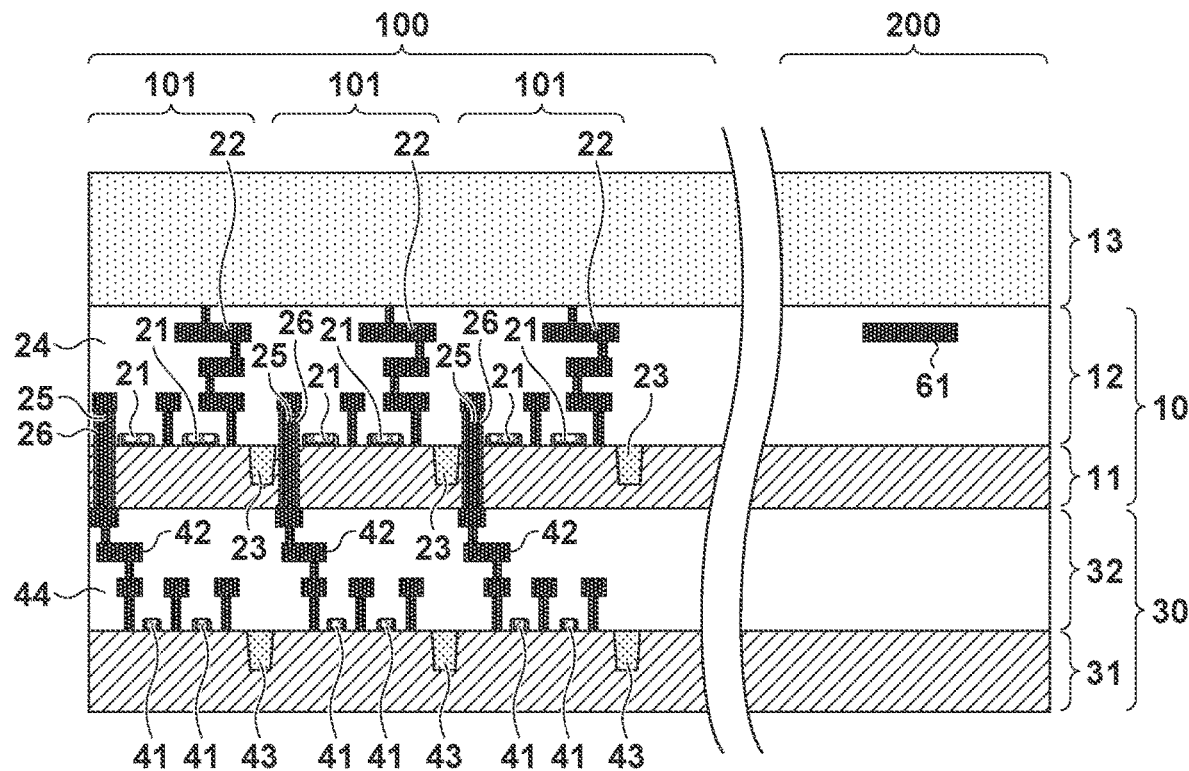

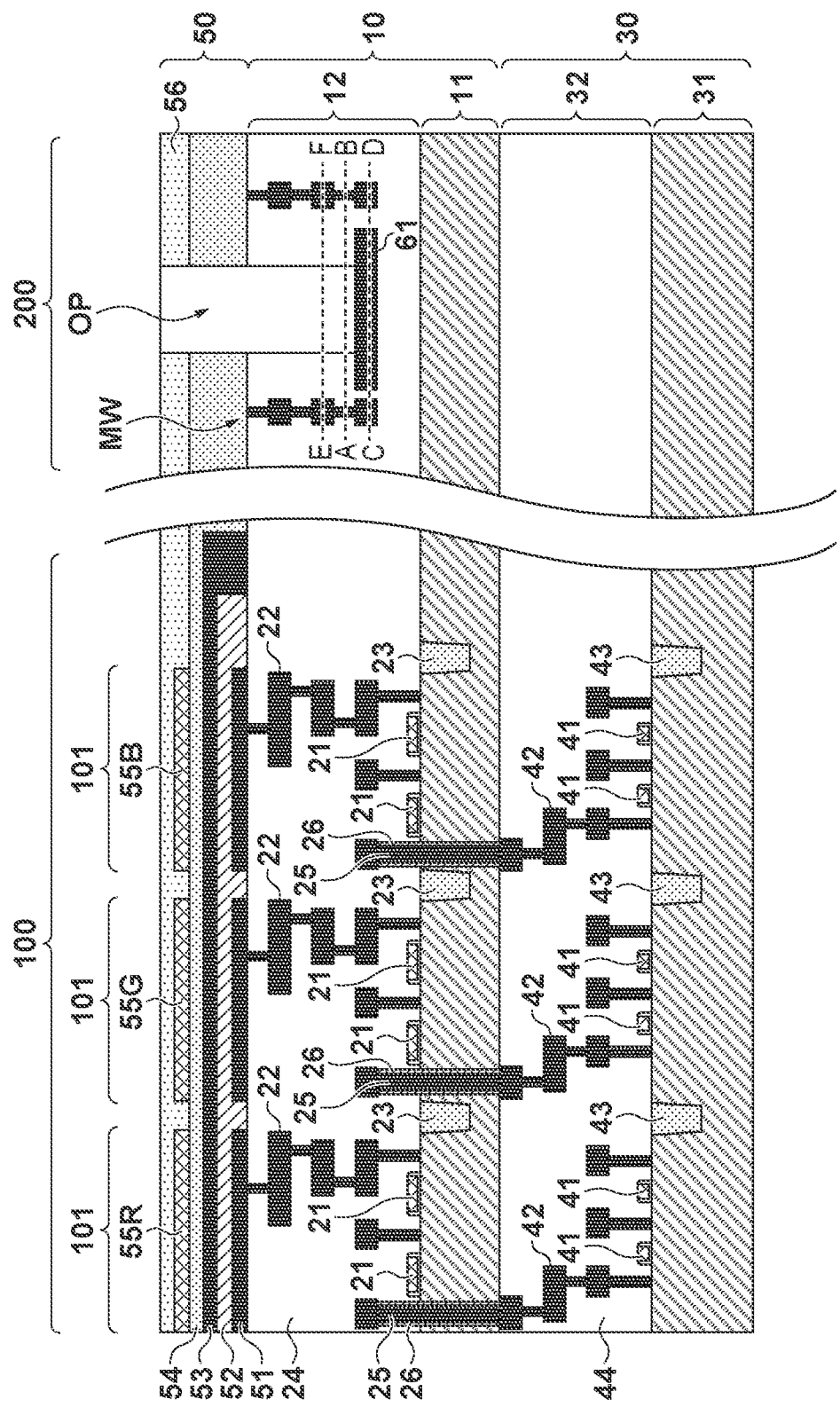

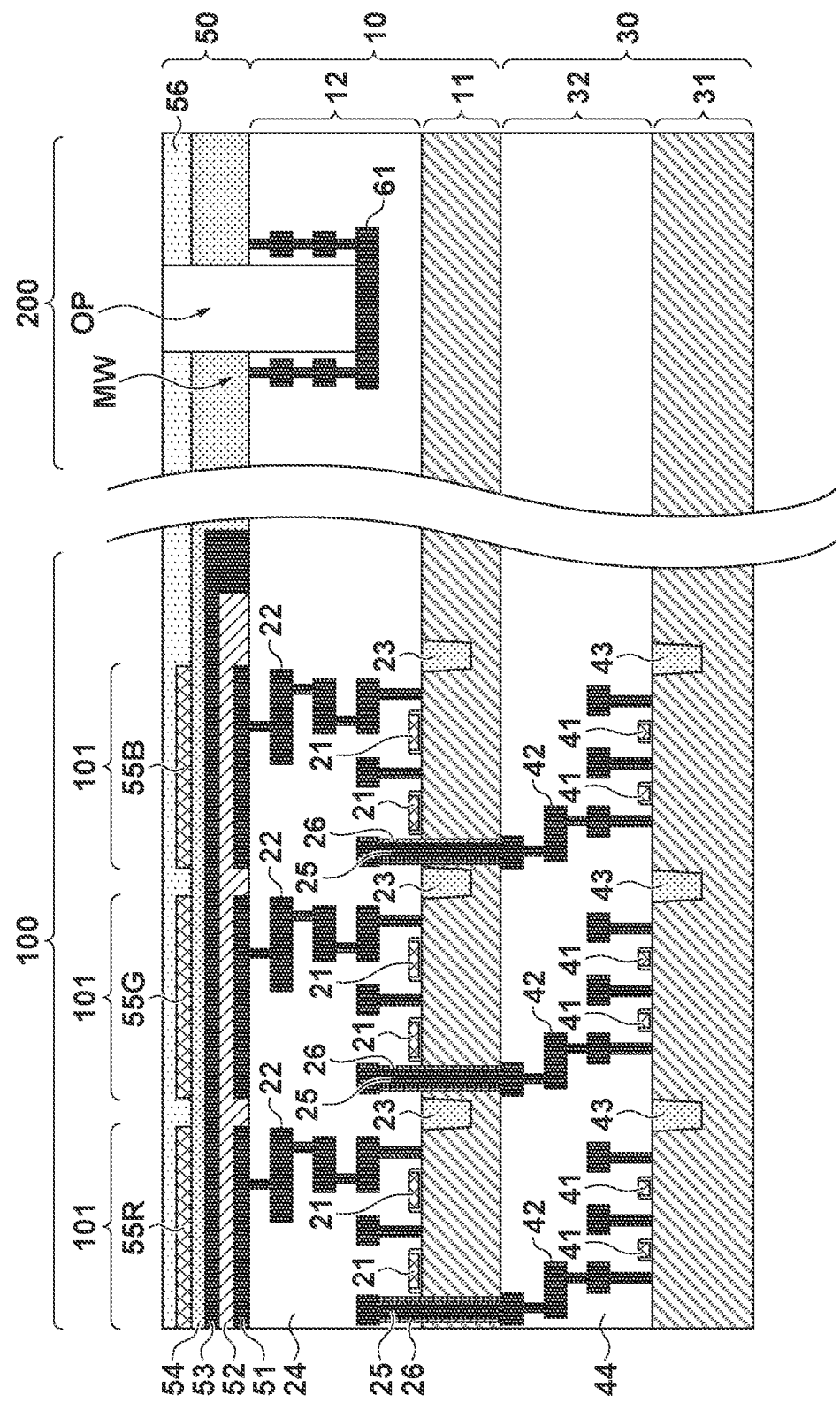

LIGHT EMITTING DEVICE, IMAGE CAPTURING DEVICE, ELECTRONIC APPARATUS, AND MOVING BODY

BACKGROUND OF THE INVENTION

Field of the Invention

The present invention relates to a light emitting device, an image capturing device, an electronic apparatus, and a moving body.

Description of the Related Art

A device in which a plurality of semiconductor substrates are stacked is known. Japanese Patent Laid-Open No. 2018-174246 describes a semiconductor device in which a first substrate and a second substrate are stacked. The first substrate includes a light emitting element, a light receiving element, and a first transistor for driving the light receiving element. The second substrate includes a second transistor for driving the light emitting element.

In the device formed by stacking the plurality of substrates, if a pad electrode cannot be accessed from above in a state in which a display device is placed while the surface arranged with the light emitting element faces upward, it is difficult to perform light emission inspection in an inspection step before packaging.

SUMMARY OF THE INVENTION

The present invention provides a device having a structure advantageous in performing inspection before packaging.

One of aspects of the invention provides a light emitting device in which a first substrate including a first semiconductor substrate and a first wiring layer, a second substrate including a second semiconductor substrate and a second wiring layer, and a light emitting layer are stacked, wherein the light emitting layer is arranged between a structure including the first substrate and the second substrate and a predetermined virtual plane, at least one of the first wiring layer and the second wiring layer includes a pad electrode, and the light emitting layer and the structure include an aperture that exposes the pad electrode to the virtual plane.

Further features of the present invention will become apparent from the following description of exemplary embodiments with reference to the attached drawings.

BRIEF DESCRIPTION OF THE DRAWINGS

FIG. 5 is a view for explaining the manufacturing method of the display device or the light emitting device exemplarily shown in FIG. 1;

FIGS. 10A to 10D are views schematically and exemplarily showing the sectional structure of a display device or a light emitting device according to the second embodiment;

FIG. 12 is a view schematically and exemplarily showing the sectional structure of the display device or the light emitting device according to the second embodiment;

DESCRIPTION OF THE EMBODIMENTS

Figure 1:
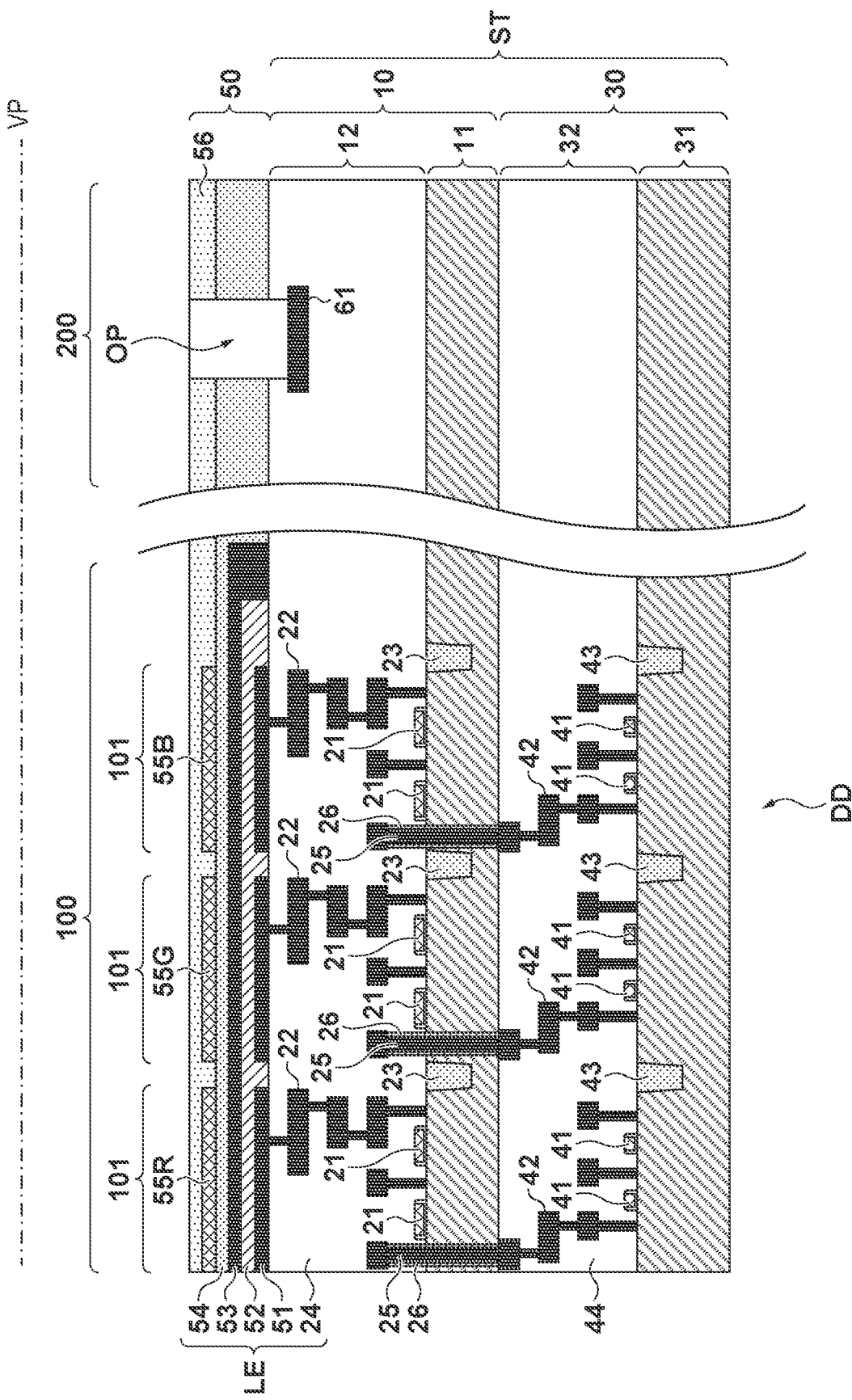
FIG. 1 is a view schematically and exemplarily showing the sectional structure of a display device or a light emitting device according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First, an example in which a light emitting device according to the present invention is embodied as a display device will be described below. A display device DD in the following description may be read as the light emitting device DD. FIG. 1 schematically and exemplarily shows the sectional structure of the display device DD according to the first embodiment. The display device DD is formed by stacking a first substrate 10 including a first semiconductor substrate 11 and a first wiring layer 12, a second substrate 30 including a second semiconductor substrate 31 and a second wiring layer 32, and a light emitting layer 50. The light emitting layer 50 can be arranged between a structure ST including the first substrate 10 and the second substrate 30 and a predetermined virtual plane VP. The virtual plane VP may be understood as a plane on which the viewpoint for observing the light emitting device DD is placed. At least one of the first wiring layer 12 and the second wiring layer 32 can include a pad electrode 61. The light emitting layer 50 and the structure ST can include an aperture OP that exposes the pad electrode 61 to the virtual plane VP. The light emitting layer 50 can include a plurality of light emitting elements LE and a sealing layer 54 covering the plurality of light emitting elements LE. The aperture OP can include a through hole provided in the sealing layer 54.

The light emitting layer 50 may further include a plurality of color filters 55G, and 55B arranged on the sealing layer 54, and a protective layer 56 covering the plurality of color filters 55R, 55G, and 55B. The aperture OP can include a through hole provided in the protective layer 56. The filter 55R can be a red filter, the color filter 55G can be a green filter, and the color filter 55B can be a blue filter. Note that the display device DD can include a plurality of the color filters 55R, a plurality of the color filters 55G, and a plurality of the color filters 55B. Hereinafter, when explaining the color filters 55R, 55G, and 55B without discriminating them from each other, they will be described as the color filters 55.

The first substrate 10 can have a structure in which the first wiring layer 12 is stacked on the first semiconductor substrate 11. The first wiring layer 12 can include an electrically conductive path 22 arranged so as to form one or a plurality of layers, and an interlayer insulating film 24 supporting and surrounding the electrically conductive path 22. The electrically conductive path 22 can include a metal pattern or a metallized pattern. The electrically conductive path 22 can also include a contact plug and/or a via plug. The second substrate 20 can have a structure in which the second wiring layer 32 is stacked on the second semiconductor substrate 31. The second wiring layer 32 can include an electrically conductive path 42 arranged so as to form one or a plurality of layers, and an interlayer insulating film 44 supporting and surrounding the electrically conductive path 42. The electrically conductive path 42 can include a metal pattern or a metallized pattern. The electrically conductive path 42 can also include a contact plug and/or a via plug.

Each of the first semiconductor substrate 11 and the second semiconductor substrate 31 can be, for example, a silicon substrate. Each of the electrically conductive paths 22 and 42 can be made of, for example, copper (Cu), tungsten (W), aluminum (Al), or the like. In a planar view or an orthogonal projection with respect to the virtual plane VP, the display device DD can be formed to include a pixel array portion 100 including a plurality of pixels 101, and a peripheral portion 200 arranged between the pixel array portion 100 and the outer edge of the display device DD. A plurality of first transistors 21 forming a part of the pixel array portion 100 can be provided in the interface between the first semiconductor substrate 11 and the first wiring layer 12 and its vicinity. Each pixel 101 can include the light emitting element LE and the multiple first transistors 21 for driving the light emitting element LE. Shallow Trench Isolations (STIs) 23 serving as isolation portions for electrically separating the plurality of transistors 21 from each other can be provided in the first semiconductor substrate 11. A plurality of second transistors 41 forming a control circuit for controlling the pixel array portion 100 can be provided in the interface between the second semiconductor substrate 31 and the second wiring layer 32 and its vicinity. Shallow Trench Isolations (STIs) 43 serving as isolation portions for electrically separating the plurality of transistors 41 from each other can be provided in the second semiconductor substrate 31.

The first wiring layer 12 can be arranged between the light emitting layer 50 and the first semiconductor substrate 11. The second wiring layer 32 can be arranged between the first substrate 10 and the second semiconductor substrate 31. In another point of view, the first substrate 10 and the second substrate 30 can be bonded so as to bond the first semiconductor substrate 11 and the second wiring layer 32. A penetrating electrode 25 penetrating the first semiconductor substrate 11 can be provided in the first substrate 10. The electrically conductive path 22 and the electrically conductive path 42 can be electrically connected by the penetrating electrode 25. The display device DD can include a plurality of the penetrating electrodes 25. The plurality of the penetrating electrodes 25 may be arranged in the pixel array portion 100, may be arranged in the peripheral portion 200, or may be distributed and arranged in both the pixel array portion 100 and the peripheral portion 200.

The light emitting layer 50 can be arranged on the first wiring layer 12 of the first substrate 10. The light emitting layer 50 can include the plurality of light emitting elements LE forming the pixel array portion 100. Each light emitting element LE can include a lower electrode 51, an organic layer 52, and an upper electrode 53. In an example, the upper electrode 53 can be provided commonly for the plurality of light emitting elements LE. In an example, the lower electrode 51 is an anode electrode, and the upper electrode 53 is a cathode electrode. However, in another example, the lower electrode 51 is a cathode electrode, and the upper electrode 53 is an anode electrode. The organic layer 52 can include at least a light emitting layer. The organic layer 52 may further include, in addition to the light emitting layer, at least one of a hole injection layer, a hole transport layer, an electron injection layer, and an electron transport layer. In an example, the lower electrode 51 is formed for each pixel 101 and separated from another lower electrode 51. The lower electrode 51 of each pixel 101 can be electrically connected to the corresponding electrically conductive path 22. In each pixel 101, light emission of the light emitting element LE can be controlled based on a driving signal transmitted from the pixel circuit arranged in the first substrate 10. The light emitting layer 50 can include the sealing layer 54 covering the plurality of light emitting elements LE. The light emitting layer 50 may further include the plurality of color filters 55 arranged on the sealing layer 54, and the protective layer 56 covering the plurality of color filters 55.

The pad electrode 61 can be arranged in the peripheral portion 200. The pad electrode 61 can be arranged, for example, as a part of the electrically conductive path 22 in the first wiring layer 12. Alternatively, the pad electrode 61 may be arranged as a part of the electrically conductive path 42 in the second wiring layer 32. Alternatively, the pad electrode 61 may be arranged as a part of the electrically conductive path 22 in the first wiring layer 12 and arranged as a part of the electrically conductive path 42 in the second wiring layer 32. The light emitting layer 50 and the structure ST can include the aperture OP that exposes the pad electrode 61 to the virtual plane VP. In another point of view, the display device DD can include the aperture OP provided in the light emitting layer 50 and the structure ST so as to expose the pad electrode 61 to the virtual plane VP. The pad electrode 61 can be observed from the virtual plane VP. In another point of view, it is possible to access the pad electrode 61 from the virtual plane VP side, and bring an inspection probe into contact with the electrode pad 61 from the virtual plane VP side.

Figure 2:
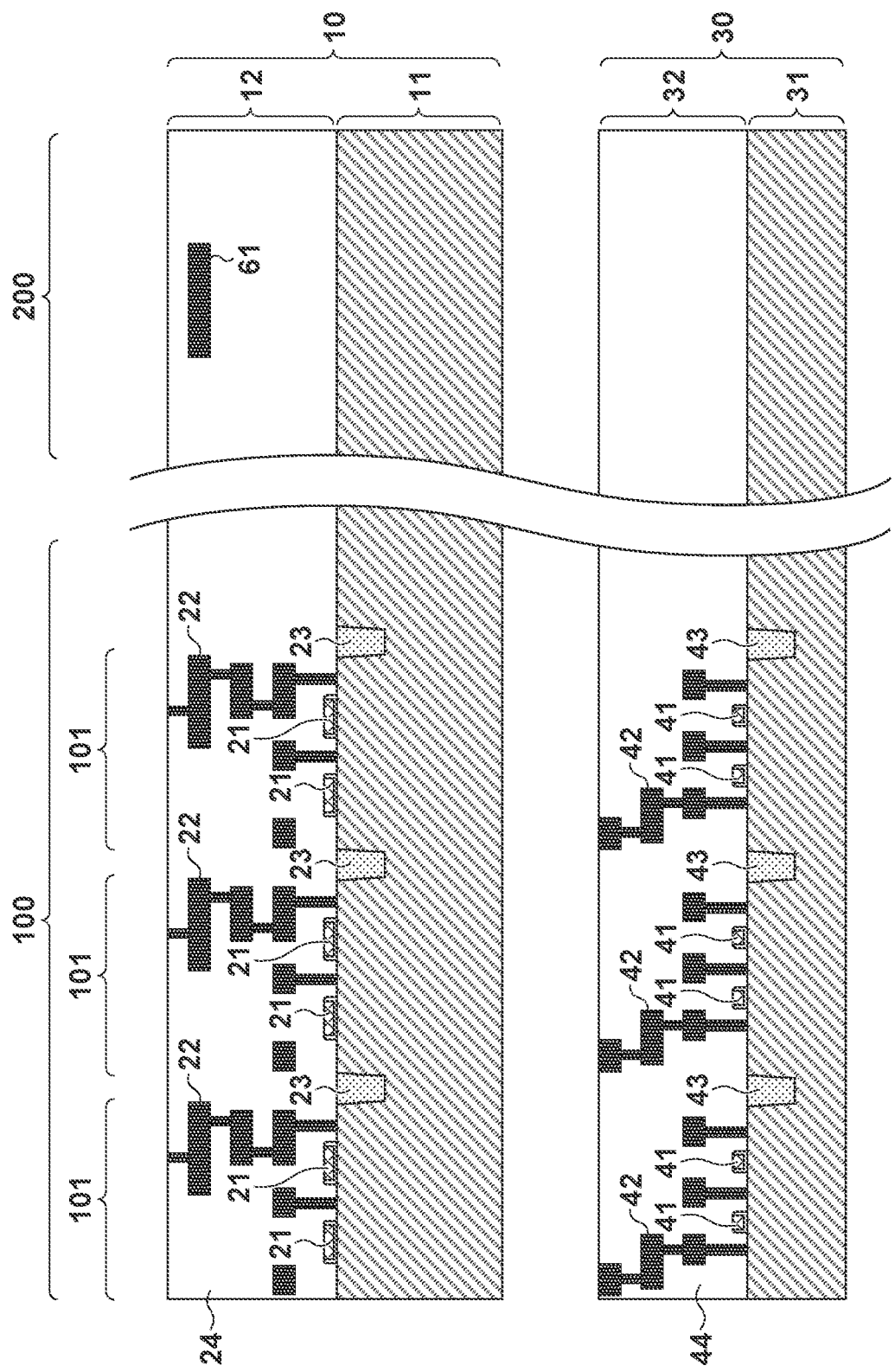
FIG. 2 is a view for explaining the manufacturing method of the display device or the light emitting device exemplarily shown in FIG. 1.

The manufacturing method of the display device DD exemplarily shown in FIG. 1 will be exemplarily described with reference to FIGS. 2 to 7. First, steps up to formation of the wiring layers 12 and 32 can be performed independently on the first substrate 10 and the second substrate 30. For example, as shown in FIG. 2, for the first substrate 10, after the STIs 23 and the first transistors 21 are formed in one main surface of the first semiconductor substrate 11, the first wiring layer 12 including the electrically conductive path 22 and the interlayer insulating film 24 can be formed so as to form one or a plurality of layers. Here, when forming the electrically conductive path 22, the pad electrode 61 can also be formed as a part of the electrically conductive path 22. For the second substrate 30, after the STIs 43 and the second transistors 41 are formed in one of two main surfaces of the second semiconductor substrate 31, the second wiring layer 32 including the electrically conductive path 42 and the interlayer insulating film 44 can be formed so as to form one or a plurality of layers.

Each of the interlayer insulating films 24 and 44 can include, for example, at least one of a silicon oxide film and a silicon nitride film. When the electrically conductive path 22 forms a plurality of layers, all of the plurality of layers may be made of the same material, or materials corresponding to the respective layers may be employed. Similarly, when the electrically conductive path 42 forms a plurality of layers, all of the plurality of layers may be made of the same material, or materials corresponding to the respective layers may be employed. The first semiconductor substrate 11 shown in FIG. 2 schematically shows a state before backgrinding of the first semiconductor substrate 11.

Figure 3:
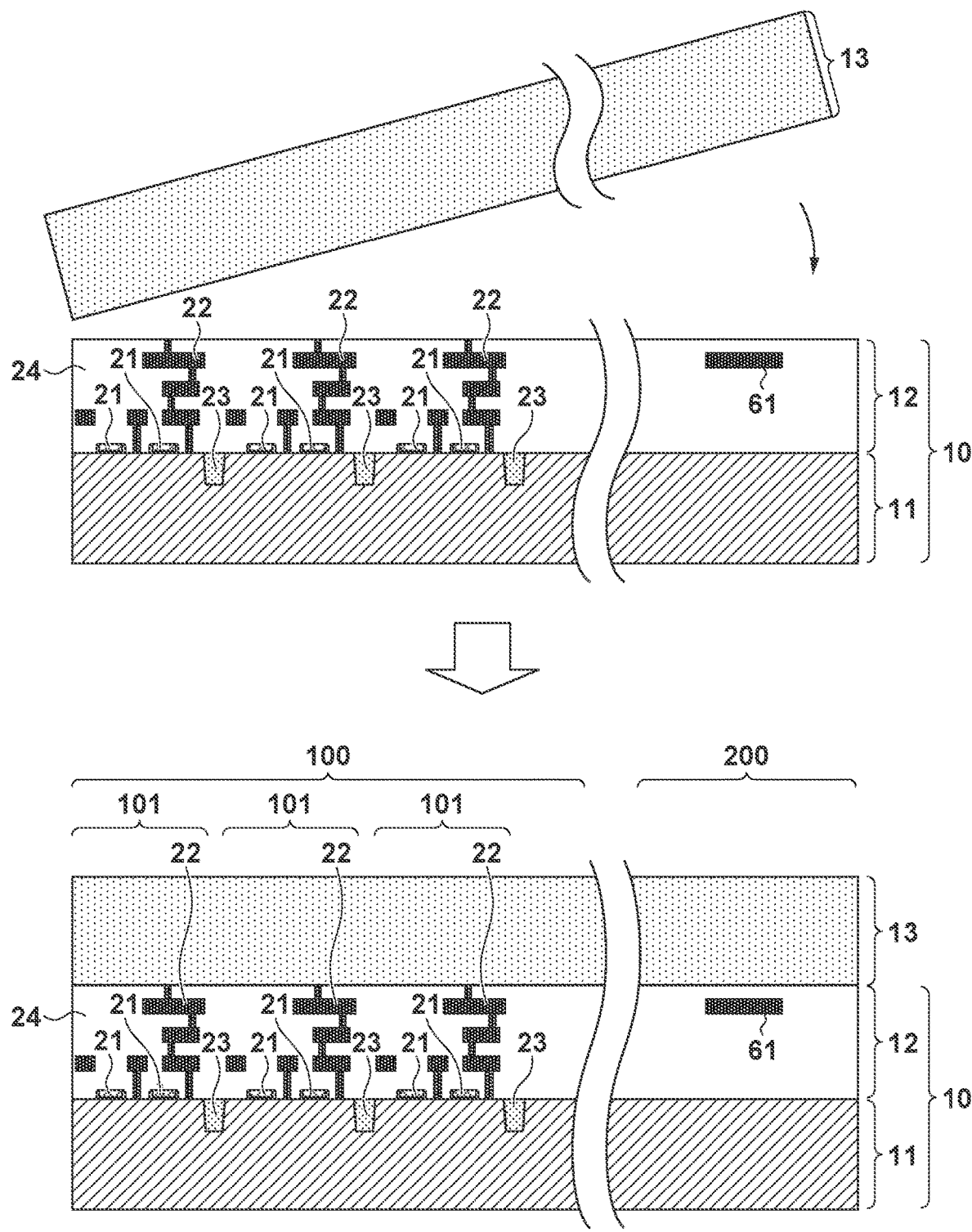
FIG. 3 is a view for explaining the manufacturing method of the display device or the light emitting device exemplarily shown in FIG. 1.

Then, as schematically shown in FIG. 3, a support substrate 13 can be bonded to the first wiring layer 12 of the first substrate 10. The support substrate 13 can be made of, for example, glass, but may be made of another material. When bonding the support substrate 13, for example, the surface of the first wiring layer 12 of the first substrate 10 can be coated with a UV-curable organic adhesive. Then, the support substrate 13 can be arranged on the first substrate 10 via the organic adhesive. After this, the first substrate 10 and the support substrate 13 can be bonded by irradiating the organic adhesive with ultraviolet light through the support substrate 13.

Figure 4:
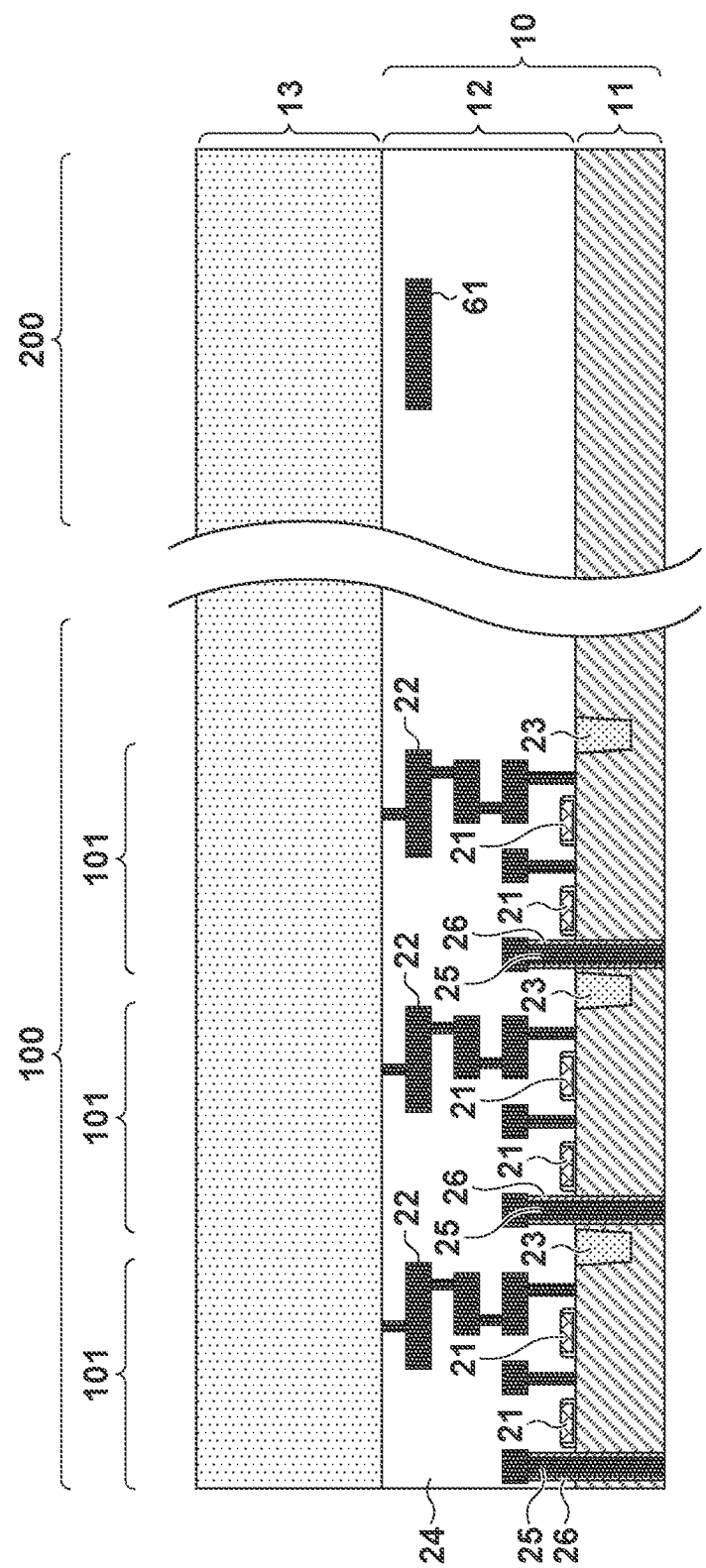
FIG. 4 is a view for explaining the manufacturing method of the display device or the light emitting device exemplarily shown in FIG. 1.

Then, as schematically shown in FIG. 4, after backgrinding of the back surface (lower surface) of the first semiconductor substrate 11 to the extent not giving influence on the device characteristics, the penetrating electrode 25 penetrating the first semiconductor substrate 11 can be formed. At this time, after the aperture that exposes a part of the electrically conductive path 22 is formed in the first semiconductor substrate 11, an insulating film 26 is formed so as to cover the side surface of the aperture, and then a conductive member is filled into the aperture. Thus, the penetrating electrode 25 can be formed.

Then, as schematically shown in FIG. 5, the separately manufactured first substrate 10 and second substrate 30 can be bonded. The bonding can be performed by a wafer bonding technique such that, for example, the first semiconductor substrate 11 and the second wiring layer 32 are bonded. At this time, after a surface treatment is performed on the surface of the first semiconductor substrate 11 and the surface of the second wiring layer 32 to be bonded, alignment between them is performed. With this, the penetrating electrode 25 and the electrically conductive path 42 formed in the uppermost layer of the second wiring layer 32 can be electrically connected to each other.

Thereafter, the above-described UV-curable organic adhesive is dissolved with a solvent, and the support substrate 13 bonded to the first substrate 10 can be separated from the first substrate 10. Further, in order to remove the residual organic adhesive, a surface treatment can be performed on the surface of the first semiconductor substrate 11 of the first substrate 10.

Figure 6:
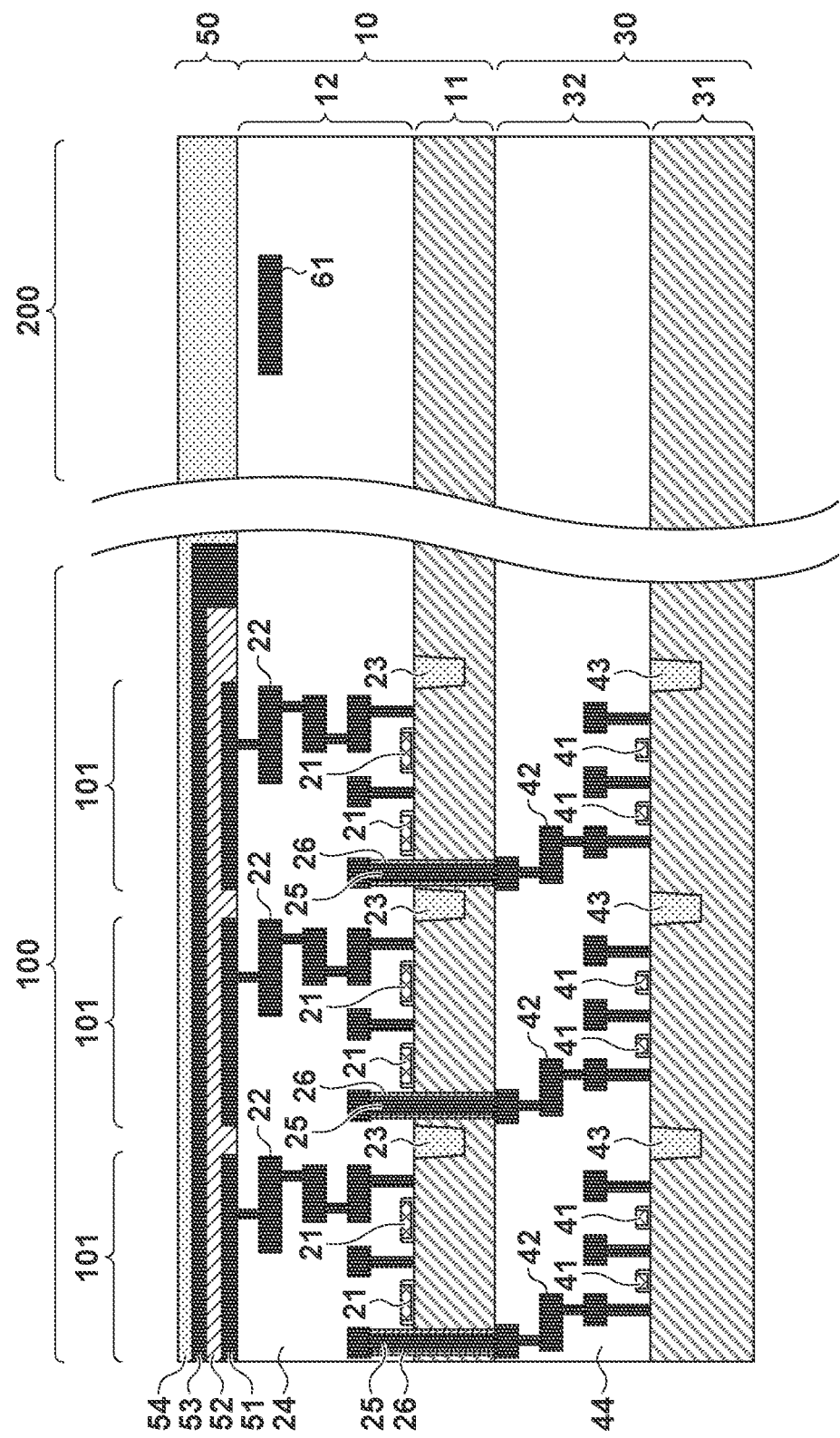
FIG. 6 is a view for explaining the manufacturing method of the display device or the light emitting device exemplarily shown in FIG. 1.

Then, as schematically shown in FIG. 6, the light emitting layer 50 can be formed on the first substrate 10 or the first wiring layer 12. First, a metal film serving as the material of the lower electrode 51 can be deposited on the upper surface of the first wiring layer 12. This metal film can be made of, for example, any one of aluminum (Al), copper (Cu), and titanium (Ti). Then, the lower electrode 51 can be formed by patterning the metal film. Subsequently, the organic layer 52 can be formed so as to cover the lower electrode 51 and the first wiring layer 13. Further, the upper electrode 53 can be formed so as to cover the organic layer 52 and the first wiring layer 13. The upper electrode 53 can be made of a transparent conductive material such as, for example, tin oxide, indium oxide, zinc oxide, or zinc indium oxide. Finally, the sealing layer 54 can be formed so as to cover the upper electrode 53 and the first wiring layer 13.

Figure 7:
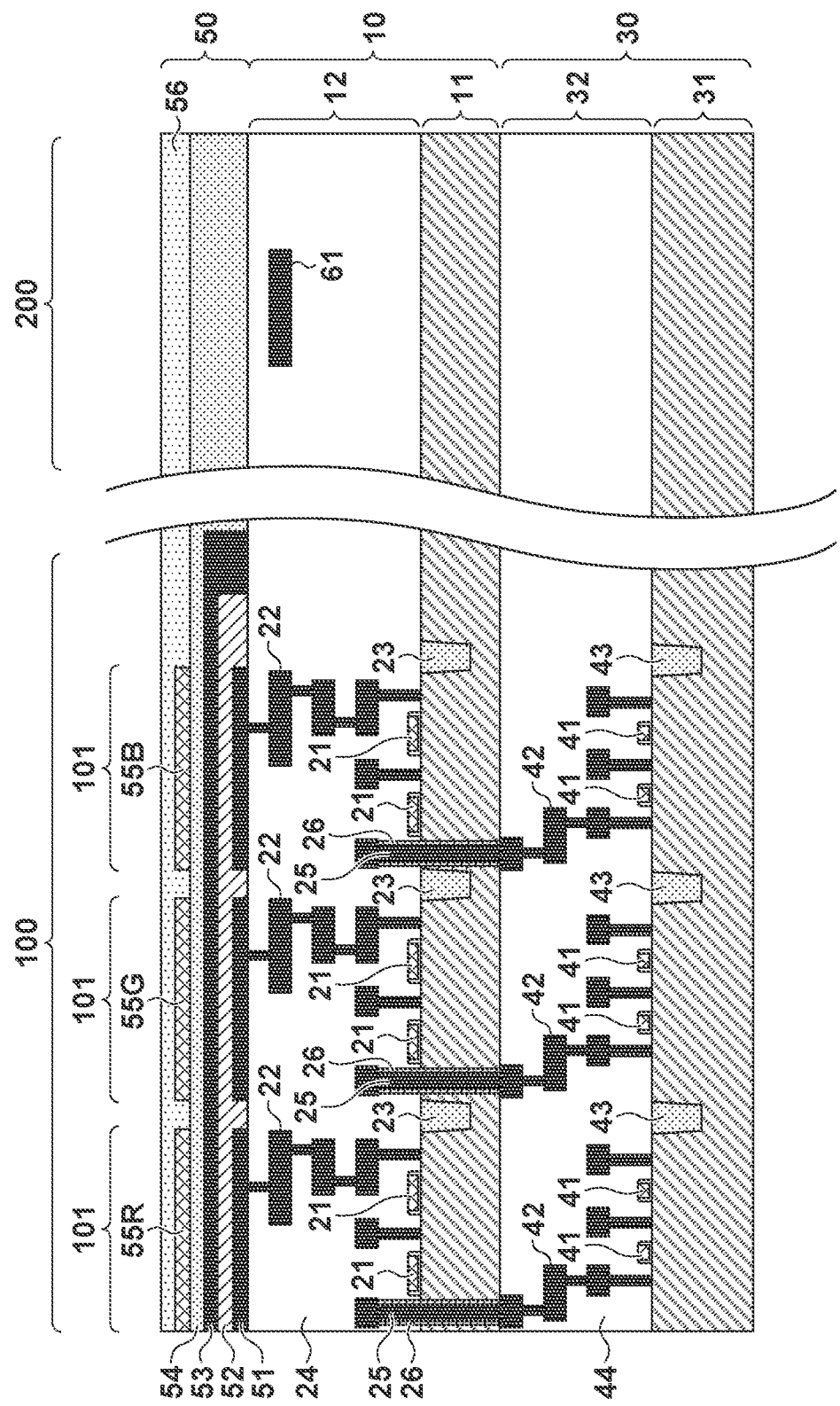
FIG. 7 is a view for explaining the manufacturing method of the display device or the light emitting device exemplarily shown in FIG. 1.

Then, as schematically shown in FIG. 7, the plurality of color filters 55 and the protective layer 56 can be formed. First, the plurality of color filters 55 can be formed on the upper surface of the sealing layer 54 of the pixel array portion 100. As the plurality of color filters 55, color filters of three primary colors, that is, red, blue, and green color filters may be arranged in a predetermined array, or color filters of complementary colors, that is, cyan, magenta, and yellow color filters may be arranged in a predetermined array. A white color filter may be added to them. Subsequently, the protective layer 56 can be formed so as to cover the plurality of color filters 55 and the sealing layer 54.

Finally, as schematically shown in FIG. 1, the aperture OP can be formed so as to expose the pad electrode 61 arranged in the peripheral portion 200. More specifically, the aperture OP can be formed by etching the protective layer 56 and the sealing layer 54 so as to expose the pad electrode 61.

According to the first embodiment, during inspection (wafer inspection) before packaging, it is possible to bring a probe into contact with the pad electrode 61 from the side of the space (virtual plane VP side) facing the light emitting layer 50. Therefore, light emission inspection can be easily performed during inspection before packaging. This is advantageous in reducing a decrease in mounting yield and suppressing an increase in cost.

Figure 8:
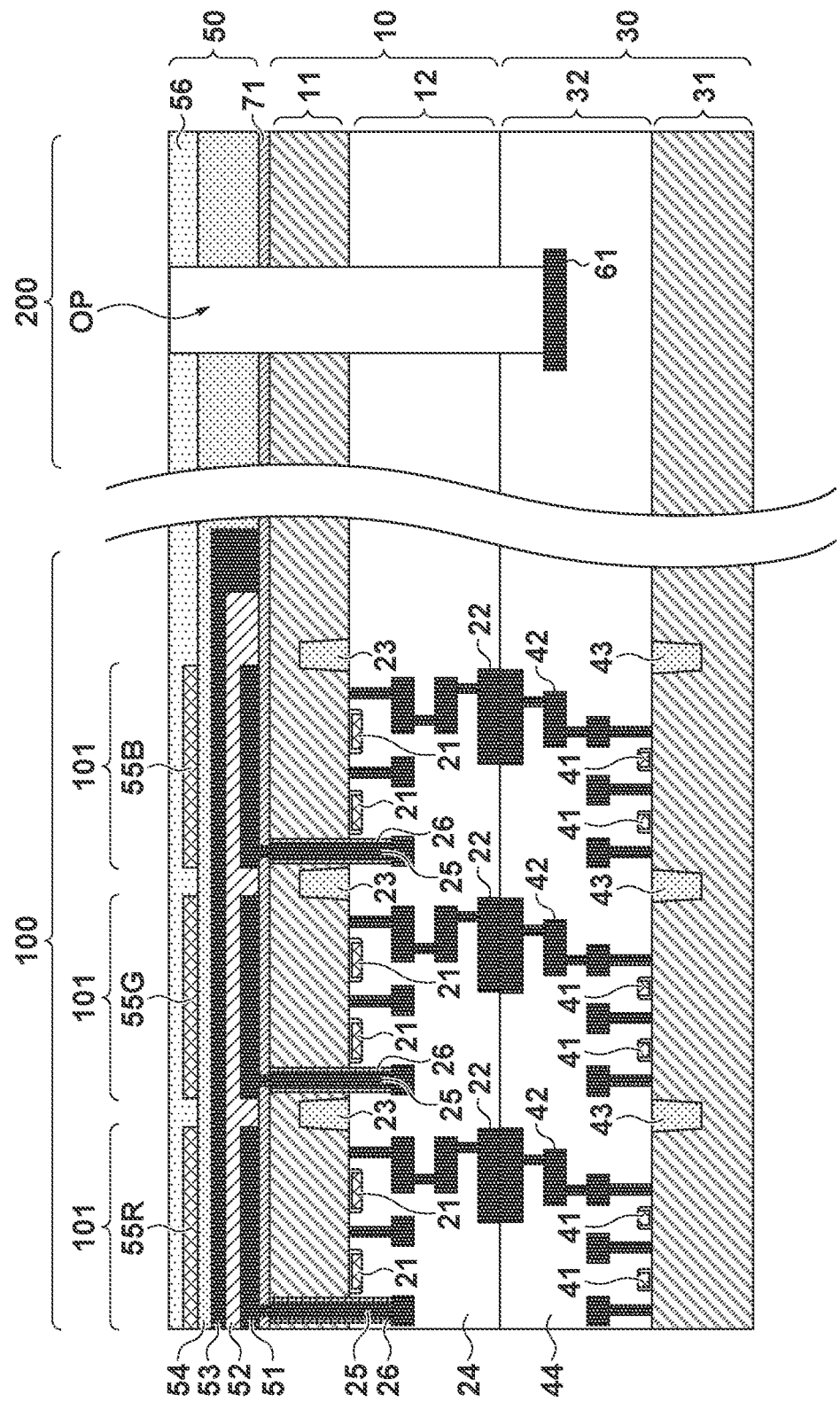
FIG. 8 is a view schematically and exemplarily showing the sectional structure of a modification of the display device or the light emitting device according to the first embodiment.

The method of bonding the first substrate 10 and the second substrate 30, or the surface of the first substrate 10 and the surface of the second substrate 30 to be bonded is not limited to a specific example. Further, the arrangement of the pad electrode 61 is not limited to a specific example. For example, as schematically shown in FIG. 8, the first substrate 10 and the second substrate 30 may be bonded such that the first wiring layer 12 faces the second wiring layer 32. The first wiring layer 12 and the second wiring layer 32 can be electrically connected by, for example, metal bonding such as Cu—Cu bonding. As schematically shown in FIG. 8, the first wiring layer 12 can be arranged between the first semiconductor substrate 11 and the second substrate 30. The second wiring layer 32 can be arranged between the first substrate 10 and the second semiconductor substrate 31. The first substrate 10 can be arranged between the light emitting layer 50 and the second substrate 30, and the pad electrode 61 can be arranged in the second wiring layer 32.

The light emitting layer 50 can be formed on the first semiconductor substrate 11 of the first substrate 10. The lower electrode 51 can be electrically connected to the electrically conductive path 22 in the first wiring layer 12 via the penetrating electrode 25 formed in the first semiconductor substrate 11. Further, an insulating film 71 for insulating the lower electrode 51 from the first semiconductor substrate 11 can be formed in the interface between the lower electrode 51 and the first semiconductor substrate 11. The first substrate 10 and the second substrate 30 may be bonded such that the first semiconductor substrate 11 faces the second semiconductor substrate 31.

Figure 9:
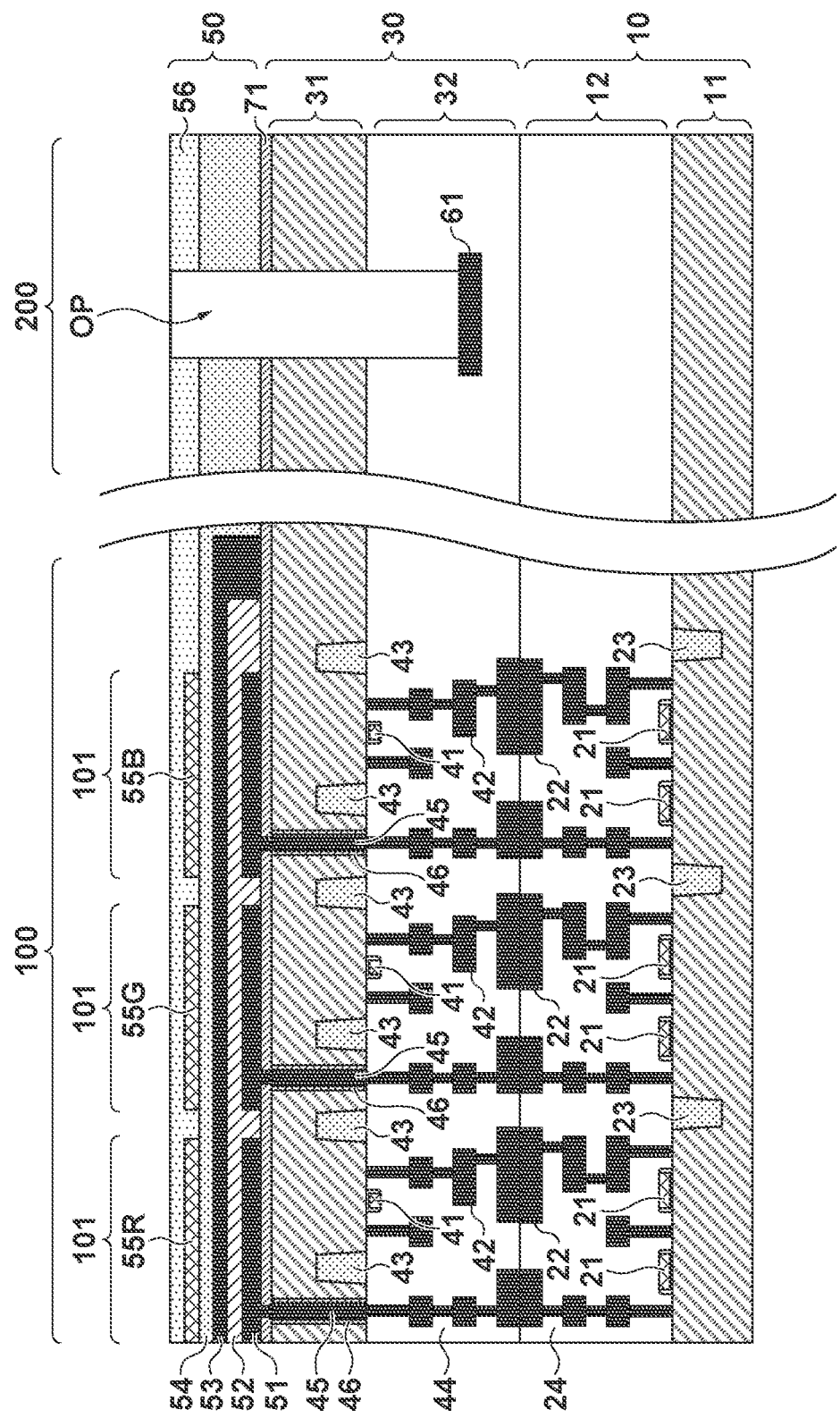
FIG. 9 is a view schematically and exemplarily showing the sectional structure of another modification of the display device or the light emitting device according to the first embodiment.

As schematically shown in FIG. 9, the second substrate 30 may be arranged between the light emitting layer 50 and the first substrate 10, and the pad electrode 61 may be arranged in the second wiring layer 32. The second semiconductor substrate 31 can be arranged between the light emitting layer 50 and the second wiring layer 32. The first wiring layer 12 can be arranged between the second substrate 30 and the first semiconductor substrate 11. A penetrating electrode 45 can be provided so as to penetrate the second semiconductor substrate 31.

The light emitting layer 50 can be formed on the second semiconductor substrate 31 of the second substrate 30. The lower electrode 51 can be electrically connected to the electrically conductive path 22 in the first wiring layer 12 via the penetrating electrode 45 formed in the second semiconductor substrate 31 and the electrically conductive path 42 in the second wiring layer 32. Further, the insulating film 71 for insulating the lower electrode 51 from the second semiconductor substrate 31 can be formed in the interface between the lower electrode 51 and the second semiconductor substrate 31.

Figure 10B:
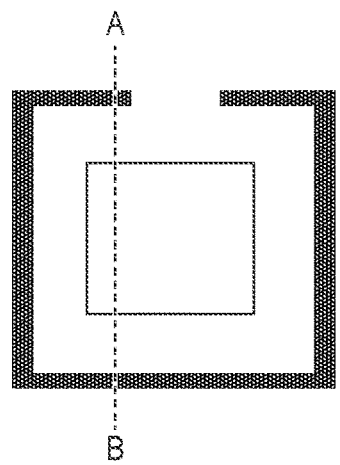
Figure 10C:
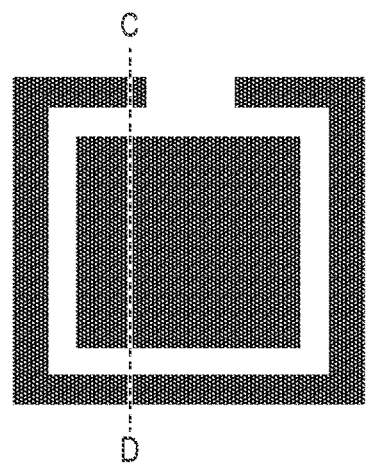
Figure 10D:
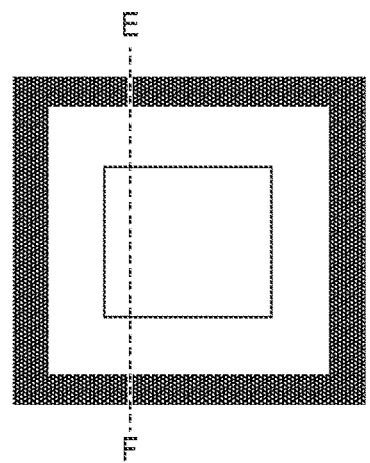
Figure 11A:
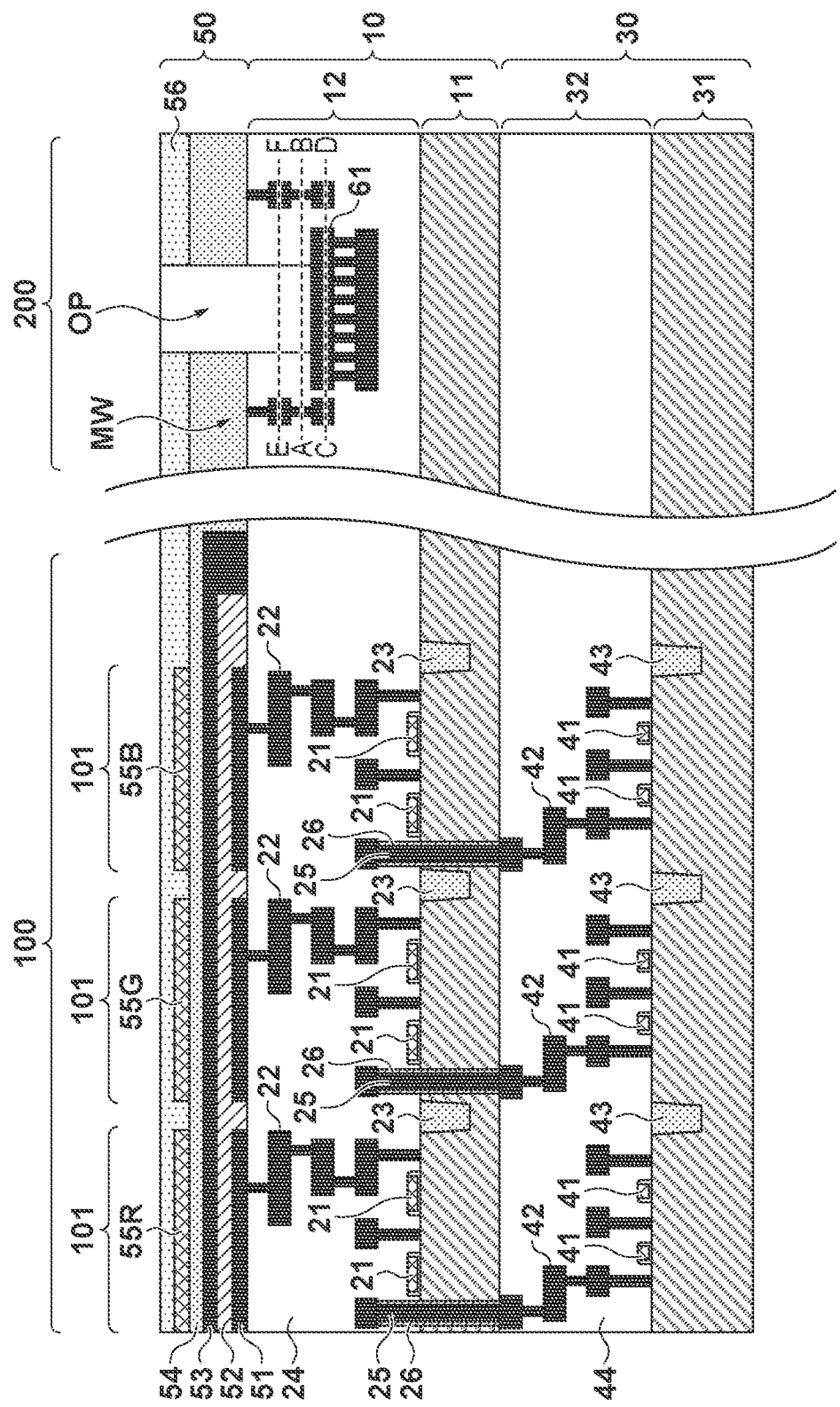
FIGS. 11A to 11D are views schematically and exemplarily showing the sectional structure of the display device or the light emitting device according to the second embodiment.
Figure 11B:
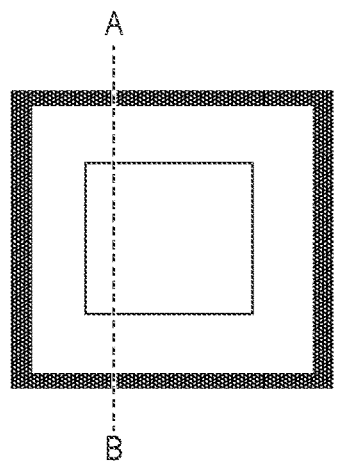
Figure 11C:
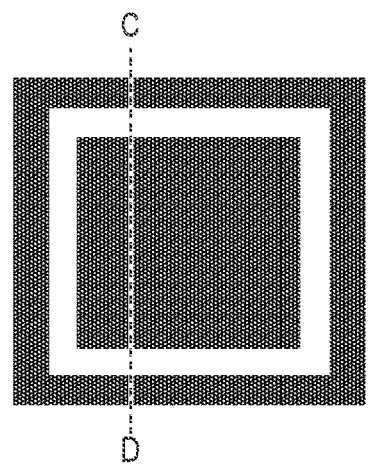
Figure 11D:
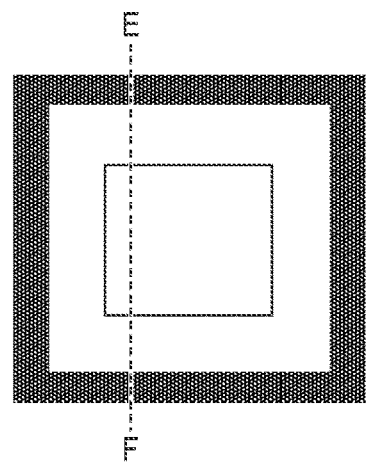

A display device DD according to the second embodiment will be described below with reference to FIGS. 10A to 10D and 11A to 11D. Matters not mentioned as the second embodiment can follow the first embodiment. FIG. 10A schematically and exemplarily shows the sectional structure of the first example of the display device DD according to the second embodiment. FIGS. 10B to 10D are sectional views taken along a line A-B, a line C-D, and a line E-F in FIG. 10A, respectively. FIG. 11A schematically and exemplarily shows the sectional structure of the second example of the display device DD according to the second embodiment. FIGS. 11B to 11D are sectional views taken along a line A-B, a line C-D, and a line E-F in FIG. 11A, respectively. The display device DD can include a metal wall MW arranged so as to at least partially surround the side surface of an aperture OP. The metal wall MW may be formed in a step of forming an electrically conductive path 22. In this case, an increase in the number of manufacturing steps can be suppressed. When the display device DD is formed as an organic device, in other words, when a light emitting element LE includes an organic light emitting element, in order to suppress deterioration of the characteristics of the organic light emitting element caused by water, it is preferable to suppress permeation of water into a light emitting layer 50. The metal wall MW can function to suppress permeation of water into the light emitting layer 50. As shown in FIGS. 11B to 11D, the display device DD may include the metal wall MW arranged so as to circumferentially surround the side surface of the aperture OP.

FIG. 12 schematically and exemplarily shows the sectional structure of the third example of the display device DD according to the second embodiment. As schematically shown in FIG. 12, the metal wall MW may be electrically connected to a pad electrode 61.

Figure 13:
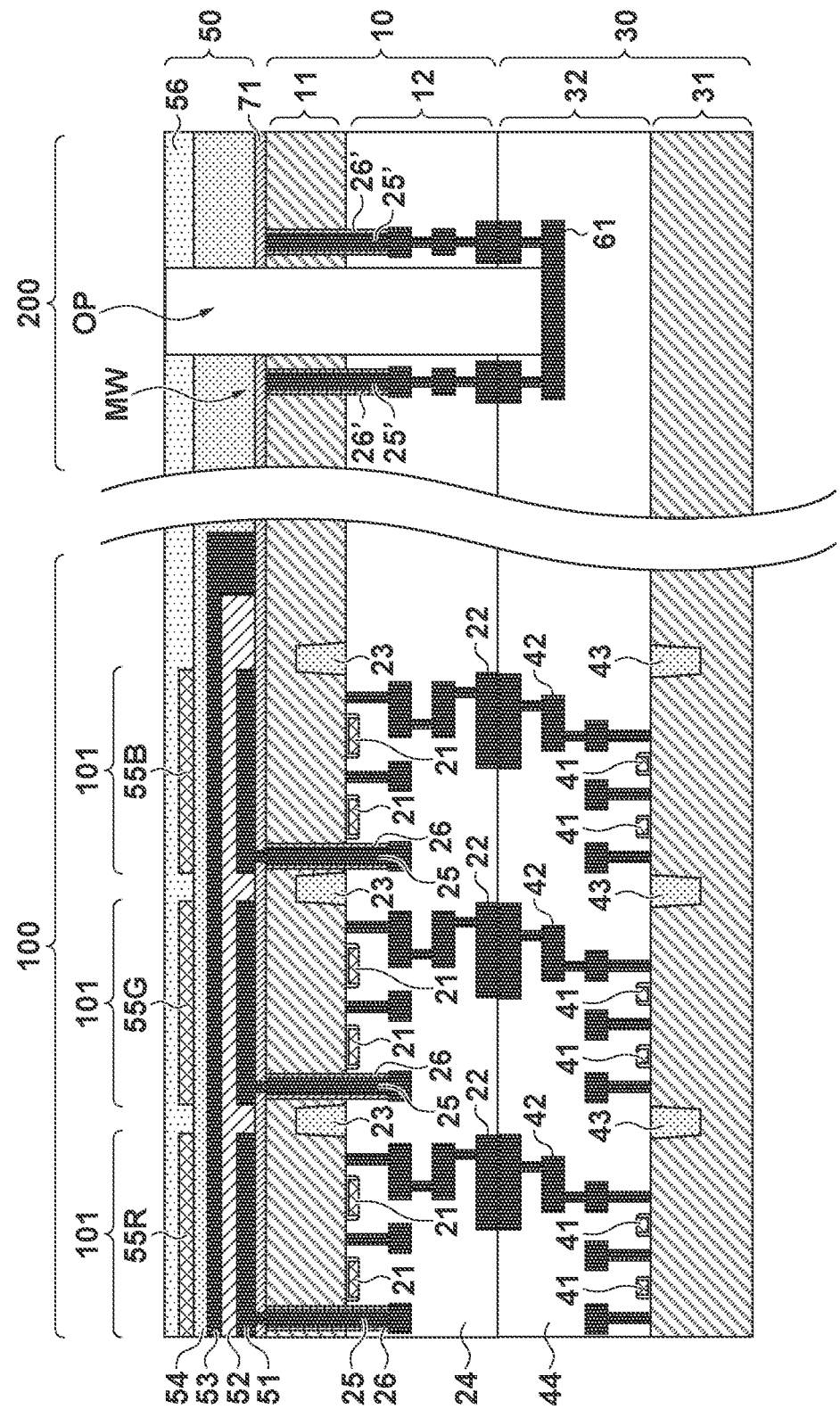
FIG. 13 is a view schematically and exemplarily showing the sectional structure of the display device or the light emitting device according to the second embodiment.

FIG. 13 schematically and exemplarily shows the sectional structure of the fourth example of the display device DD according to the second embodiment. As schematically shown in FIG. 13, the metal wall MW may include a portion 25' arranged in a first semiconductor layer 11. The portion 25' can be arranged so as to surround the side surface of the aperture OP at least partially and preferably circumferentially. The portion 25' may be formed in the step of forming the penetrating electrode 25. In this case, an increase in the number of manufacturing steps can be suppressed. The portion 25' can be insulated from the first semiconductor substrate 11 by an insulating film 26'. The insulating film 26' may be formed in a step of forming an insulating film 26. In this case, an increase in the number of manufacturing steps can be suppressed.

Respective components will be supplementarily described below.

The organic light emitting element is provided by forming an insulating layer, a first electrode, an organic compound layer, and a second electrode on the structure ST. A protective layer, a color filter, a microlens, and the like may be provided on a cathode. If a color filter is provided, a planarizing layer can be provided between the protective layer and the color filter. The planarizing layer can be made of acrylic resin or the like. The same applies to a case in which a planarizing layer is provided between the color filter and the microlens.

A pair of electrodes may be used as the electrodes. The pair of electrodes may be an anode and a cathode. If an electric field is applied in the direction in which the organic light emitting element emits light, the electrode having a high potential is the anode, and the other is the cathode. It can also be said that the electrode that supplies holes to the light emitting layer is the anode and the electrode that supplies electrons is the cathode.

As the constituent material of the anode, a material having a work function as large as possible may be used. For example, a metal such as gold, platinum, silver, copper, nickel, palladium, cobalt, selenium, vanadium, or tungsten, a mixture containing some of them, an alloy obtained by combining some of them, or a metal oxide such as tin oxide, zinc oxide, indium oxide, indium tin oxide (ITO), or zinc indium oxide can be used. Furthermore, a conductive polymer such as polyaniline, polypyrrole, or polythiophene can also be used.

One of these electrode materials may be used singly, or two or more of them may be used in combination. The anode may be formed by a single layer or a plurality of layers.

If the anode is used as a reflective electrode, for example, chromium, aluminum, silver, titanium, tungsten, molybdenum, an alloy thereof, a stacked layer thereof, or the like can be used. The above materials can function as a reflective film having no role as an electrode. If the anode is used as a transparent electrode, an oxide transparent conductive layer made of indium tin oxide (ITO), indium zinc oxide, or the like can be used, but the present invention is not limited thereto. A photolithography technique can be used to form the electrode.

On the other hand, as the constituent material of the cathode, a material having a small work function may be used. Examples of the material include an alkali metal such as lithium, an alkaline earth metal such as calcium, a metal such as aluminum, titanium, manganese, silver, lead, or chromium, and a mixture containing some of them. Alternatively, an alloy obtained by combining these metals can also be used. For example, a magnesium-silver alloy, an aluminum-lithium alloy, an aluminum-magnesium alloy, a silver-copper alloy, a zinc-silver alloy, or the like can be used. A metal oxide such as indium tin oxide (ITO) can also be used. One of these electrode materials may be used singly, or two or more of them may be used in combination. The cathode may have a single-layer structure or a multi-layer structure. Among others, silver is preferable for use. To suppress aggregation of silver, a silver alloy is more preferable for use. The ratio of the alloy is not limited as long as aggregation of silver can be suppressed. For example, the ratio between silver and another metal may be 1:1, 3:1, or the like.

The cathode may be a top emission element using an oxide conductive layer made of ITO or the like, or may be a bottom emission element using a reflective electrode made of aluminum (Al) or the like, and is not particularly limited. The method of forming the cathode is not particularly limited, but direct current sputtering or alternating current sputtering is more preferable since good film coverage is provided and the resistance is easily lowered.

A pixel separating layer is formed of a silicon nitride (SiN) film, a silicon oxynitride (SiON) film, or a silicon oxide (SiO) film formed using a chemical vapor deposition method (CVD method). In order to increase the resistance in the in-plane direction of the organic compound layer, the organic compound layer, particularly, the hole transport layer is preferably deposited so as to have a small film thickness on the side wall of the pixel separating layer. More specifically, by increasing the taper angle of the side wall of the pixel separating layer or the film thickness of the pixel separating layer to increase vignetting during vapor deposition, the organic compound layer can be deposited so as to have a small film thickness on the side wall of the pixel separating layer.

On the other hand, it is preferable to adjust the taper angle of the side wall of the pixel separating layer or the film thickness of the pixel separating layer to the extent not forming a gap in the protective layer formed on the pixel separating layer. If no gap is formed in the protective layer, generation of defects in the protective layer can be reduced. Since generation of defects in the protective layer is reduced, a decrease in reliability due to generation of a dark spot or occurrence of a conductive failure of the second electrode can be reduced. It has been found that the taper angle of 60° (inclusive) to 90° (inclusive) can sufficiently reduce the occurrence of defects. The film thickness of the pixel separating layer is desirably 10 nm (inclusive) to 150 nm (inclusive). A similar effect can be obtained in an arrangement including only pixel electrodes without the pixel separating layer. However, in this case, the film thickness of the pixel electrode is preferably set to be equal to or smaller than half the film thickness of the organic layer, or the end portion of the pixel electrode is preferably formed to have a forward taper of less than 60° to reduce short circuit of the organic light emitting element.

Also in a case in which the first electrode is the cathode and the second electrode is the anode, a high color gamut and low-voltage driving can be achieved by forming the electron transport material and charge transport layer satisfying conditional equation (1) and equation (2), and forming the light emitting layer on the charge transport layer.

The organic compound layer may be formed by a single layer or a plurality of layers. If the organic compound layer includes a plurality of layers, the layers can be called a hole injection layer, a hole transport layer, an electron blocking layer, a light emitting layer, a hole blocking layer, an electron transport layer, and an electron injection layer in accordance with the functions of the layers. The organic compound layer is mainly formed from an organic compound but may contain inorganic atoms and an inorganic compound. For example, the organic compound layer may contain copper, lithium, magnesium, aluminum, iridium, platinum, molybdenum, zinc, or the like. The organic compound layer can be arranged between the first and second electrodes, and may be arranged in contact with the first and second electrodes.

A protective layer may be provided on the second electrode. For example, by adhering glass provided with a moisture absorbing agent on the second electrode, permeation of water or the like into the organic compound layer can be suppressed and occurrence of display defects can be suppressed. Furthermore, as another embodiment, a passivation film made of silicon nitride or the like may be provided on the cathode to suppress permeation of water or the like into the organic compound layer. For example, the protective layer can be formed by forming the cathode, transferring it to another chamber without breaking the vacuum, and forming a silicon nitride film having a thickness of 2 μm by a CVD method. The protective layer may be provided using an atomic deposition method (ALD method) after forming a film using the CVD method. The material of the film by the ALD method is not limited but can be silicon nitride, silicon oxide, aluminum oxide, or the like. A silicon nitride film may further be formed by the CVD method on the film formed by the ALD method. The film formed by the ALD method may have a film thickness smaller than that of the film formed by the CVD method. More specifically, the film thickness of the film formed by the ALD method may be 50% or less, or 10% or less.

A color filter may be provided on the protective layer. For example, a color filter considering the size of the organic light emitting element may be provided on another substrate, and this substrate may be bonded to the substrate with the organic light emitting element provided thereon. Alternatively, a color filter may be patterned on the above-described protective layer using a photolithography technique. The color filter can be formed from a polymeric material.

A planarizing layer may be provided between the color filter and the protective layer. The planarizing layer is provided to reduce unevenness of the lower layer. The planarizing layer may be called a material resin layer without limiting the purpose of the layer. The planarizing layer can be formed from an organic compound, and can be made of a low-molecular material or a polymeric material. However, a polymetric material is preferable.

The planarizing layers may be provided above and below the color filter, and the same or different materials may be used for them. More specifically, examples of the material include polyvinyl carbazole resin, polycarbonate resin, polyester resin, ABS resin, acrylic resin, polyimide resin, phenol resin, epoxy resin, silicone resin, and urea resin.

The organic light emitting device can include an optical member such as a microlens on the light emission side. The microlens can be made of acrylic resin, epoxy resin, or the like. The microlens can aim to increase the amount of light extracted from the organic light emitting device and control the direction of light to be extracted. The microlens can have a hemispherical shape. If the microlens has a hemispherical shape, among tangents contacting the hemisphere, there is a tangent parallel to the insulating layer, and the contact between the tangent and the hemisphere is the vertex of the microlens. The vertex of the microlens can be decided in the same manner even in an arbitrary sectional view. That is, among tangents contacting the semicircle of the microlens in a sectional view, there is a tangent parallel to the insulating layer, and the contact between the tangent and the semicircle is the vertex of the microlens.

Furthermore, the middle point of the microlens can also be defined. In the section of the microlens, a line segment from a point at which an arc shape ends to a point at which another arc shape ends is assumed, and the middle point of the line segment can be called the middle point of the microlens. A section for determining the vertex and the middle point may be a section perpendicular to the insulating layer.

The microlens includes a first surface including a convex portion and a second surface opposite to the first surface. The second surface is preferably arranged on the functional layer side of the first surface. For this arrangement, the microlens is required to be formed on the light emitting device. If the functional layer is an organic layer, it is preferable to avoid a process which produces high temperature in the manufacturing step. In addition, if it is configured to arrange the second surface on the functional layer side of the first surface, all the glass transition temperatures of organic compound forming the organic layer are preferably 100° C. or more, and more preferably 130° C. or more.

The organic compound layer (hole injection layer, hole transport layer, electron blocking layer, light emitting layer, hole blocking layer, electron transport layer, electron injection layer, and the like) forming the organic light emitting element according to an embodiment of the present invention is formed by the method to be described below.

The organic compound layer forming the organic light emitting element according to the embodiment of the present invention can be formed by a dry process using a vacuum deposition method, an ionization deposition method, a sputtering method, a plasma method, or the like. Instead of the dry process, a wet process that forms a layer by dissolving a solute in an appropriate solvent and using a well-known coating method (for example, a spin coating method, a dipping method, a casting method, an LB method, an inkjet method, or the like) can be used.

Here, when the layer is formed by a vacuum deposition method, a solution coating method, or the like, crystallization or the like hardly occurs and excellent temporal stability is obtained. Furthermore, when the layer is formed using a coating method, it is possible to form the film in combination with a suitable binder resin.

Examples of the binder resin include polyvinyl carbazole resin, polycarbonate resin, polyester resin, ABS resin, acrylic resin, polyimide resin, phenol resin, epoxy resin, silicone resin, and urea resin. However, the binder resin is not limited to them.

One of these binder resins may be used singly as a homopolymer or a copolymer, or two or more of them may be used in combination. Furthermore, additives such as a well-known plasticizer, antioxidant, and an ultraviolet absorber may also be used as needed.

The pixel circuit may be an active matrix circuit that individually controls light emission of the first and second light emitting elements. The active matrix circuit may be a voltage or current programing circuit. A driving circuit includes a pixel circuit for each pixel. The pixel circuit can include a light emitting element, a transistor for controlling light emission luminance of the light emitting element, a transistor for controlling a light emission timing, a capacitor for holding the gate voltage of the transistor for controlling the light emission luminance, and a transistor for connection to GND without intervention of the light emitting element.

The light emitting device includes a display region and a peripheral region arranged around the display region. The light emitting device includes the pixel circuit in the display region and a display control circuit in the peripheral region. The mobility of the transistor forming the pixel circuit may be smaller than that of a transistor forming the display control circuit. The slope of the current-voltage characteristic of the transistor forming the pixel circuit may be smaller than that of the current-voltage characteristic of the transistor forming the display control circuit. The slope of the current-voltage characteristic can be measured by a so-called Vg-Ig characteristic. The transistor forming the pixel circuit is a transistor connected to the light emitting element such as the first light emitting element.

The light emitting device can be formed as a display device including a plurality of pixels. Each pixel includes sub-pixels that emit light components of different colors. The sub-pixels include, for example, R, G, and B emission colors, respectively.

In each pixel, a region also called a pixel opening emits light. This region is the same as the first region. The pixel opening can have a size of 5 μm (inclusive) to 15 μm (inclusive). More specifically, the pixel opening can have a size of 11 μm, 9.5 μm, 7.4 μm, 6.4 μm, or the like. A distance between the sub-pixels can be 10 μm or less, and can be, more specifically, 8 μm, 7.4 μm, or 6.4 μm.

The pixels can have a known arrangement form in a plan view. For example, the pixels may have a stripe arrangement, a delta arrangement, a pentile arrangement, or a Bayer arrangement. The shape of each sub-pixel in a plan view may be any known shape. For example, a quadrangle such as a rectangle or a rhombus, a hexagon, or the like may be possible. A shape which is not a correct shape but is close to a rectangle is included in a rectangle, as a matter of course. The shape of the sub-pixel and the pixel arrangement can be used in combination.

The light emitting device formed as the display device may be formed as an image information processing device that includes an image input unit for inputting image information from an area CCD, a linear CCD, a memory card, or the like, and an information processing unit for processing the input information, and displays the input image.

In addition, the light emitting device formed as the display device may have a touch panel function. The driving type of the touch panel function may be an infrared type, a capacitance type, a resistive film type, or an electromagnetic induction type, and is not particularly limited. The display device may be used for the display unit of a multifunction printer.

Figure 14:
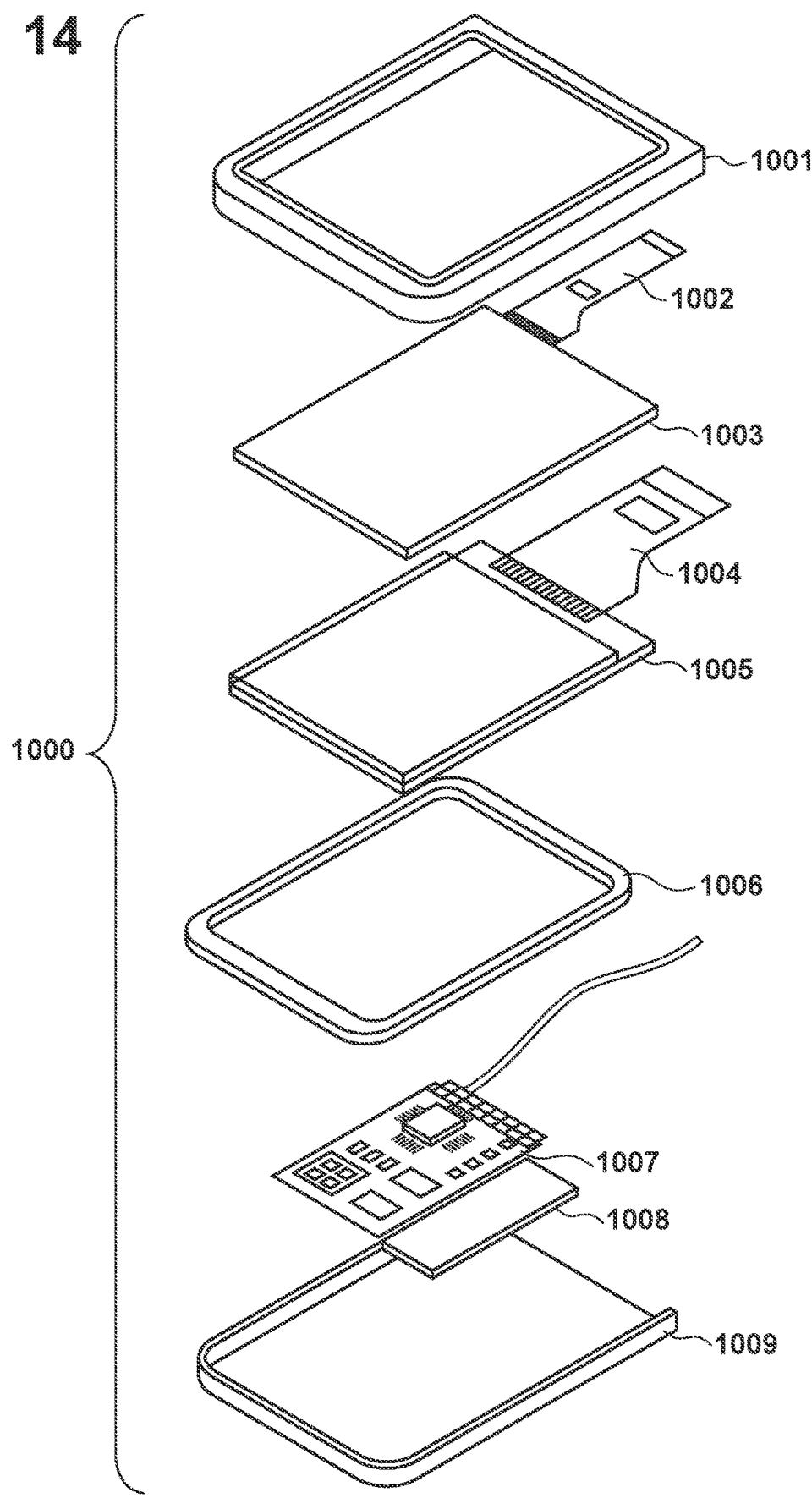
FIG. 14 is a view showing an application example of the display devices according to the first and second embodiments.

Next, application examples of the display devices according to the embodiments will be described with reference to drawings. FIG. 14 is a schematic view showing a display device 1000 as one example of the application examples of the light emitting devices DD according to the embodiment. The display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Transistors are printed on the circuit board 1007. The battery 1008 is unnecessary if the display device is not a portable apparatus. Even when the display device is a portable apparatus, the battery 1008 may be provided at another position.

The display device according to the embodiment can include color filters of red, green, and blue. The color filters of red, green, and blue can be arranged in a delta array.

The display device according to the embodiment can also be used for a display unit of a portable terminal. At this time, the display unit can have both a display function and an operation function. Examples of the portable terminal are a portable phone such as a smartphone, a tablet, and a head mounted display.

The display device according to the embodiment can be used for a display unit of an image capturing device including an optical unit including a plurality of lenses, and an image sensor for receiving light having passed through the optical unit. The image capturing device can include a display unit for displaying information acquired by the image sensor. In addition, the display unit can be either a display unit exposed outside the image capturing device, or a display unit arranged in the finder. The image capturing device can be a digital camera or a digital video camera.

Figure 15A:
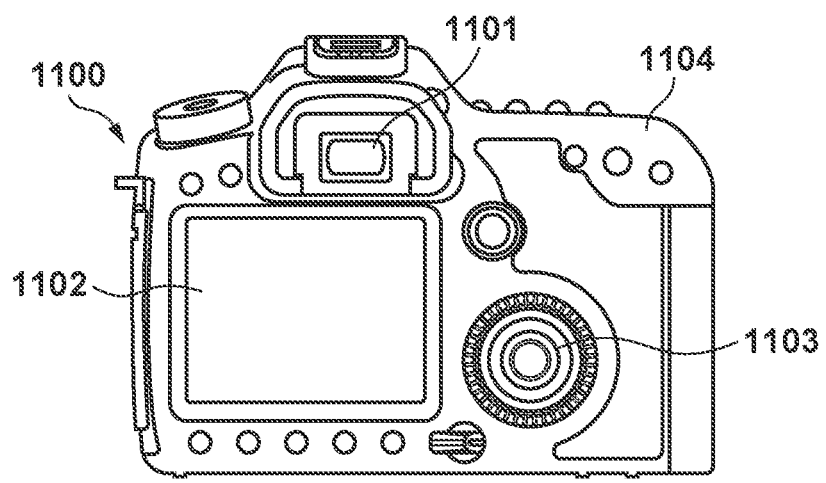
FIGS. 15A and 15B are views each showing another application example of the display devices according to the first and second embodiments.

FIG. 15A is a schematic view showing an example of the image capturing device according to the embodiment. An image capturing device 1100 can include a viewfinder 1101, a rear display 1102, an operation unit 1103, and a housing 1104. The viewfinder 1101 may include the display device according to the embodiment. In this case, the display device can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time, so the information is preferably displayed as soon as possible. Therefore, the display device using the organic light emitting element of the present invention is preferably used. This is so because the organic light emitting element has a high response speed. The display device using the organic light emitting element can be used for the apparatuses that require a high display speed more preferably than for the liquid crystal display device.

The image capturing device 1100 includes an optical unit (not shown). This optical unit includes a plurality of lenses, and forms an image on an image sensor that is accommodated in the housing 1104. The focal points of the plurality of lenses can be adjusted by adjusting the relative positions. This operation can also automatically be performed. The image capturing device may be called a photoelectric conversion device. Instead of sequentially capturing an image, the photoelectric conversion device can include, as an image capturing method, a method of detecting the difference from a previous image, a method of extracting an image from an always recorded image, or the like.

Figure 15B:
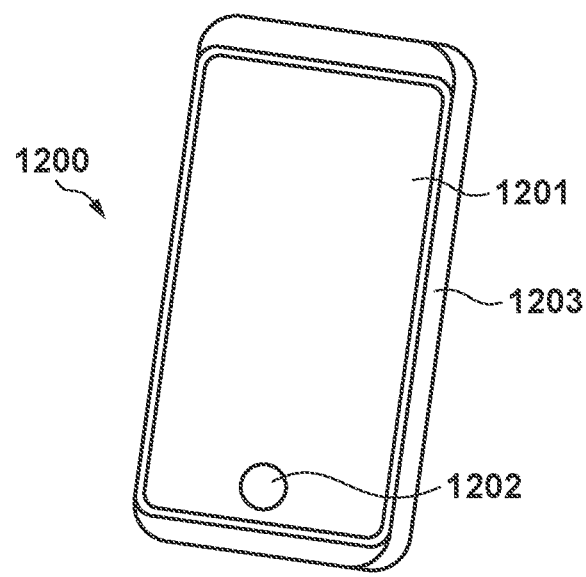

FIG. 15B is a schematic view showing an example of an electronic apparatus according to this embodiment. An electronic apparatus 1200 includes a display unit 1201, an operation unit 1202, and a housing 1203. The housing 1203 can accommodate a circuit, a printed board including this circuit, a battery, and a communication unit. The operation unit 1202 may be a button or a touch-panel-type reaction unit. The operation unit may also be a biometric authentication unit that performs unlocking or the like by authenticating a fingerprint. The electronic apparatus including the communication unit can also be regarded as a communication apparatus. The electronic apparatus can further have a camera function by including a lens and an image sensor. An image captured by the camera function is displayed on the display unit. Examples of the electronic apparatus are a smartphone and a laptop computer.

Figure 16A:
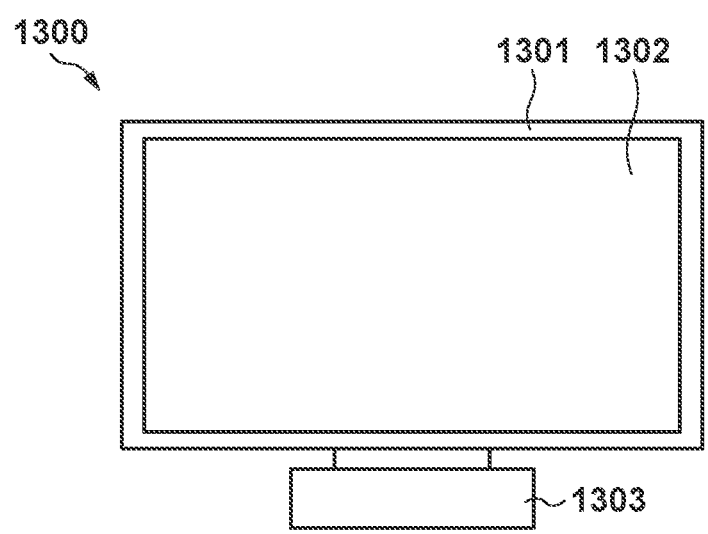
FIGS. 16A and 16B are views each showing still another application example of the display devices according to the first and second embodiments.

FIG. 16A is a schematic view showing one example of the application examples of the light emitting device according to the embodiment. FIG. 16A shows a display device such as a television monitor or a PC monitor. A display device 1300 includes a frame 1301 and a display unit 1302. The light emitting device according to the embodiment may be used in the display unit 1302. The display device 1300 includes a base 1303 that supports the frame 1301 and the display unit 1302. The base 1303 is not limited to the form shown in FIG. 16A. The lower side of the frame 1301 may also function as the base. In addition, the frame 1301 and the display unit 1302 may be bent. The radius of curvature can be 5,000 mm (inclusive) to 6,000 mm (inclusive).

Figure 16B:
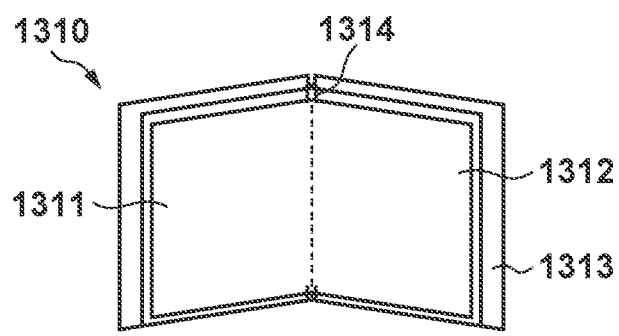

FIG. 16B is a schematic view showing another example of the application examples of the light emitting device according to the embodiment. A display device 1310 shown in FIG. 16B is configured to be foldable, that is, the display device 1310 is a so-called foldable display device. The display device 1310 includes a first display unit 1311, a second display unit 1312, a housing 1313, and a bending point 1314. Each of the first display unit 1311 and the second display unit 1312 may include the light emitting device according to the embodiment. The first display unit 1311 and the second display unit 1312 may be one seamless display device. The first display unit 1311 and the second display unit 1312 can be divided by the bending point. The first display unit 1311 and the second display unit 1312 can display different images, and can also display one image together.

Figure 17A:
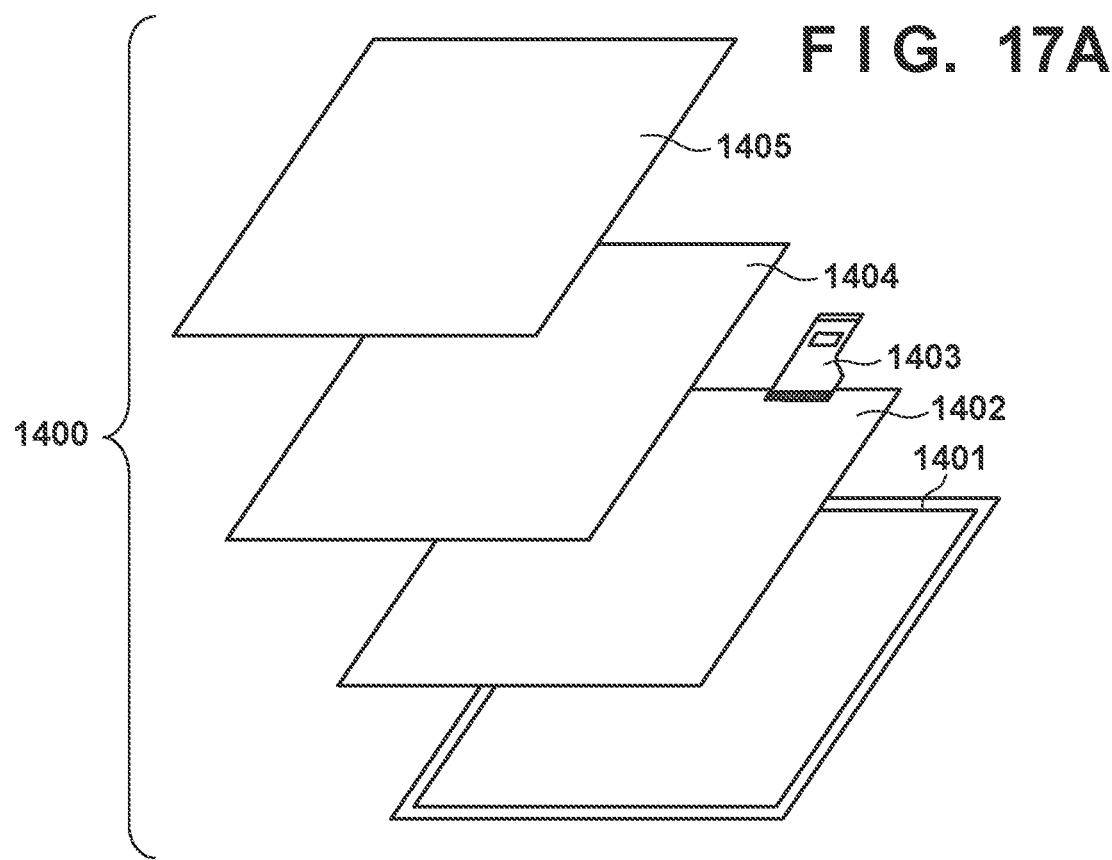
FIGS. 17A and 17B are views each showing still another application example of the display devices according to the first and second embodiments.

FIG. 17A is a schematic view showing an example of the illumination device according to this embodiment. An illumination device 1400 can include a housing 1401, a light source 1402, a circuit board 1403, an optical film 1404, and a light-diffusing unit 1405. The light source may include the light emitting device according to the embodiment. The optical film can be a filter that improves the color rendering of the light source. When performing lighting-up or the like, the light-diffusing unit can throw the light of the light source over a broad range by effectively diffusing the light. The optical film and the light-diffusing unit can be provided on the illumination light emission side. The illumination device can also include a cover on the outermost portion, as needed.

The illumination device is, for example, a device for illuminating the interior of the room. The illumination device may emit white light, natural white light, or light of any color from blue to red. The illumination device can also include a light control circuit for controlling these light components. The illumination device can also include the organic light emitting element according to the present invention and a power supply circuit connected to the organic light emitting element. The power supply circuit is a circuit for converting an AC voltage into a DC voltage. White has a color temperature of 4,200 K, and natural white has a color temperature of 5,000 K. The illumination device may also include a color filter.

In addition, the illumination device according to this embodiment may include a heat radiation unit. The heat radiation unit radiates the internal heat of the device to the outside of the device, and examples are a metal having a high specific heat and liquid silicon.

Figure 17B:
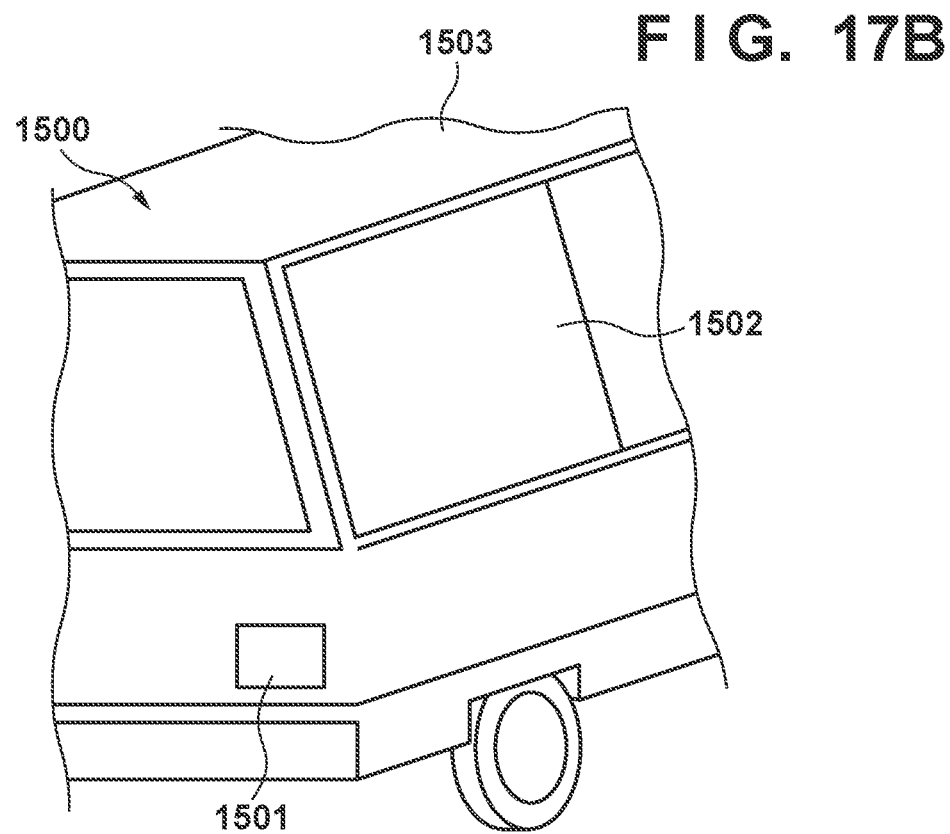

FIG. 17B is a schematic view of an automobile as an example of a moving body according to this embodiment. The automobile has a taillight as an example of the lighting appliance. An automobile 1500 has a taillight 1501, and can have a form in which the taillight is turned on when performing a braking operation or the like.

The taillight 1501 may include the light emitting device according to the embodiment. The taillight can include a protection member for protecting the organic EL element.

The material of the protection member is not limited as long as the material is a transparent material with a strength that is high to some extent, and is preferably polycarbonate. A furandicarboxylic acid derivative, an acrylonitrile derivative, or the like may be mixed in polycarbonate.

The automobile 1500 can include a vehicle body 1503, and a window 1502 attached to the vehicle body 1503. This window may be a window for checking the front and back of the automobile, and can also be a transparent display. This transparent display can include the organic light emitting element according to the embodiment. In this case, the constituent materials of the electrodes and the like of the organic light emitting element are formed by transparent members.

The moving body according to this embodiment can be a ship, an airplane, a drone, or the like. The moving body can include a main body and a lighting appliance provided on the main body. The lighting appliance can emit light for making a notification of the position of the main body. The lighting appliance includes the organic light emitting element according to the embodiment.

An application example of the display device according to each embodiment described above will be described with reference to FIGS. 18A and 18B. The display device can be applied to a system that can be worn as a wearable device such as smartglasses, an HMD, or a smart contact lens. An image capturing display device used in such an application example includes an image capturing device capable of photoelectrically converting visible light and a display device capable of emitting visible light.

Figure 18A:
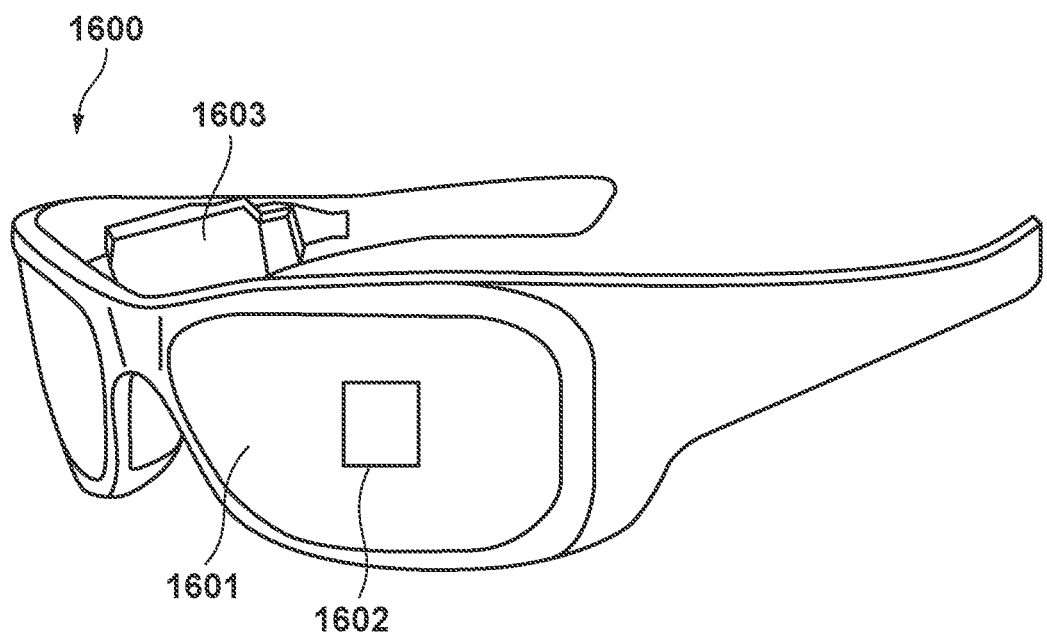
FIGS. 18A and 18B are views each showing still another application example of the display devices according to the first and second embodiments.

Glasses 1600 (smartglasses) according to one application example will be described with reference to FIG. 18A. An image capturing device 1602 such as a CMOS sensor or an SPAD is provided on the front surface side of a lens 1601 of the glasses 1600. In addition, the display device of each of the above-described embodiments is provided on the back surface side of the lens 1601.

The glasses 1600 further include a control device 1603. The control device 1603 functions as a power supply that supplies power to the image capturing device 1602 and the display device according to each embodiment. In addition, the control device 1603 controls the operations of the image capturing device 1602 and the display device. An optical system configured to condense light to the image capturing device 1602 is formed on the lens 1601.

Figure 18B:
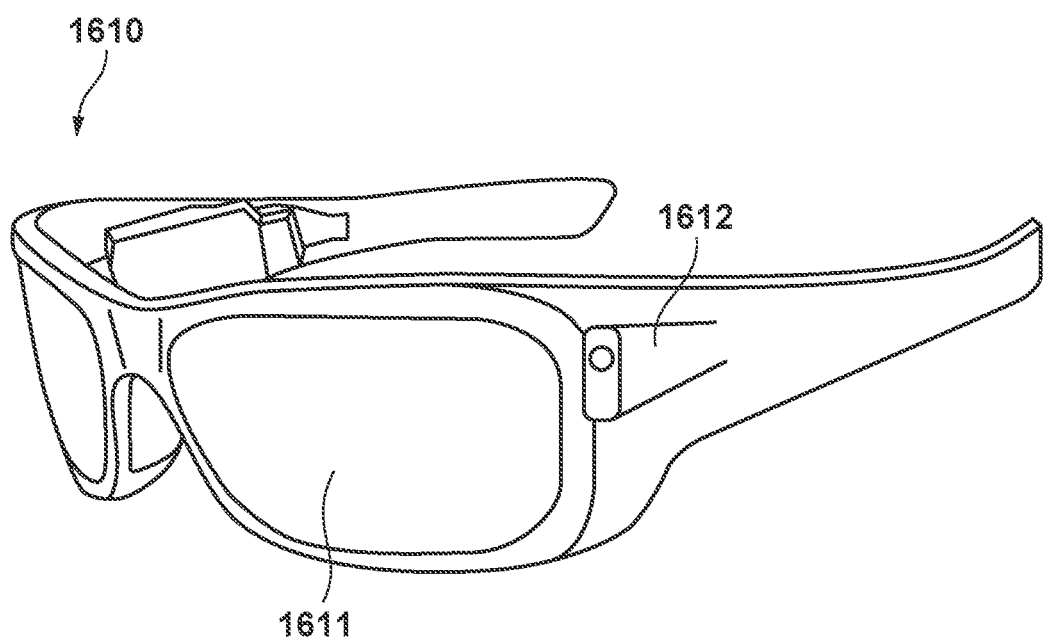

Glasses 1610 (smartglasses) according to one application example will be described with reference to FIG. 18B. The glasses 1610 includes a control device 1612, and an image capturing device corresponding to the image capturing device 1602 and a display device are mounted on the control device 1612. The image capturing device in the control device 1612 and an optical system configured to project light emitted from the display device are formed in a lens 1611, and an image is projected to the lens 1611. The control device 1612 functions as a power supply that supplies power to the image capturing device and the display device, and controls the operations of the image capturing device and the display device. The control device may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The display device according to the embodiment of the present invention may include an image capturing device including a light receiving element, and a displayed image on the display device may be controlled based on the line-of-sight information of the user from the image capturing device.

More specifically, the display device decides a first visual field region at which the user is gazing and a second visual field region other than the first visual field region based on the line-of-sight information. The first visual field region and the second visual field region may be decided by the control device of the display device, or those decided by an external control device may be received. In the display region of the display device, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control device of the display device, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the display device, the image capturing device, or an external device. If the external device holds the AI program, it is transmitted to the display device via communication.

When performing display control based on line-of-sight detection, smartglasses further including an image capturing device configured to capture the outside can preferably be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-087101, filed May 27, 2022, which is hereby incorporated by reference herein in its entirety.

What is claimed is:

1. A light emitting device in which (1) a first substrate including a first semiconductor substrate and a first wiring layer, (2) a second substrate including a second semiconductor substrate and a second wiring layer, and (3) a light emitting layer are stacked,
   wherein the light emitting layer is arranged between (a) a structure including the first substrate and the second substrate and (b) a predetermined virtual plane,
   wherein at least one of the first wiring layer and the second wiring layer includes a pad electrode,
   wherein the light emitting layer and the structure include an aperture that exposes the pad electrode to the virtual plane,
   wherein a plurality of first transistors forming a part of a pixel array portion including a plurality of pixels are provided in the first semiconductor substrate, and
   wherein a plurality of second transistors forming a control circuit configured to control the pixel array portion are provided in the second semiconductor substrate.

2. The device according to claim 1, wherein the light emitting layer includes a plurality of light emitting elements, and a sealing layer covering the plurality of light emitting elements, and
   wherein the aperture includes a through hole provided in the sealing layer.

3. The device according to claim 2, wherein the light emitting layer further includes a plurality of color filters arranged on the sealing layer, and a protective layer covering the plurality of color filters, and
   wherein the aperture includes a through hole provided in the protective layer.

4. The device according to claim 1, wherein the first substrate is arranged between the light emitting layer and the second substrate, and
   wherein the pad electrode is arranged in the first wiring layer.

5. The device according to claim 4, wherein the first wiring layer is arranged between the light emitting layer and the first semiconductor substrate, and
   wherein the second wiring layer is arranged between the first substrate and the second semiconductor substrate.

6. The device according to claim 5, wherein the second wiring layer is arranged between the first substrate and the second semiconductor substrate.

7. The device according to claim 4, wherein a penetrating electrode is provided so as to penetrate the first semiconductor substrate.

8. The device according to claim 4, wherein the first wiring layer is arranged between the first semiconductor substrate and the second substrate.

9. The device according to claim 8, wherein the second wiring layer is arranged between the first substrate and the second semiconductor substrate.

10. The device according to claim 1, wherein the first substrate is arranged between the light emitting layer and the second substrate, and
    wherein the pad electrode is arranged in the second wiring layer.

11. The device according to claim 10, wherein the first semiconductor substrate is arranged between the light emitting layer and the first wiring layer.

12. The device according to claim 11, wherein the second wiring layer is arranged between the first substrate and the second semiconductor substrate.

13. The device according to claim 9, wherein a penetrating electrode is provided so as to penetrate the first semiconductor substrate.

14. The device according to claim 1, wherein the second substrate is arranged between the light emitting layer and the first substrate, and
    wherein the pad electrode is arranged in the second wiring layer.

15. The device according to claim 14, wherein the second semiconductor substrate is arranged between the light emitting layer and the second wiring layer.

16. The device according to claim 15, wherein the first wiring layer is arranged between the second substrate and the first semiconductor substrate.

17. The device according to claim 14, wherein a penetrating electrode is provided so as to penetrate the second semiconductor substrate.

18. The device according to claim 1, wherein a metal wall is arranged so as to at least partially surround a side surface of the aperture.

19. The device according to claim 18, wherein the metal wall is electrically connected to the pad electrode.

20. The device according to claim 1, wherein a metal wall is arranged so as to circumferentially surround a side surface of the aperture.

21. The device according to claim 20, wherein the metal wall is electrically connected to the pad electrode.

22. The device according to claim 1, wherein the light emitting layer includes an organic light emitting element.

23. An image capturing device comprising:
    an optical unit including a plurality of lenses;
    an image sensor configured to receive light having passed through the optical unit; and
    the light emitting device according to claim 1, the light emitting device being configured to display an image captured by the image sensor.

24. An electronic apparatus comprising:
    the light emitting device according to claim 1;
    a housing provided with the light emitting device; and
    a communication unit provided in the housing and configured to perform external communication.

25. A moving body comprising the light emitting device according to claim 1.

26. A light emitting device in which (1) a first substrate including a first semiconductor substrate and a first wiring layer, (2) a second substrate including a second semiconductor substrate and a second wiring layer, and (3) a light emitting layer are stacked,
    wherein the light emitting layer is arranged between a structure including the first substrate and the second substrate and a predetermined virtual plane,
    wherein at least one of the first wiring layer and the second wiring layer includes a pad electrode,
    wherein the light emitting layer and the structure include an aperture that exposes the pad electrode to the virtual plane, and
    wherein a metal wall is arranged so as to at least partially surround a side surface of the aperture.

* * * * *